(12) United States Patent
Matsumoto et al.

(10) Patent No.: US 7,006,952 B1
(45) Date of Patent: Feb. 28, 2006

(54) 3-D MODEL PROVIDING DEVICE

(75) Inventors: Yukinori Matsumoto, Moriguchi (JP); Kota Fujimura, Moriguchi (JP); Kazuhide Sugimoto, Moriguchi (JP); Yasuhiro Oue, Moriguchi (JP); Toru Kitamura, Moriguchi (JP); Osamu Ota, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/913,095

(22) PCT Filed: Feb. 18, 2000

(86) PCT No.: PCT/JP00/00929

§ 371 (c)(1),
(2), (4) Date: Aug. 9, 2001

(87) PCT Pub. No.: WO00/48700

PCT Pub. Date: Aug. 24, 2000

(30) Foreign Application Priority Data

| | | | |
|---|---|---|---|
| Feb. 19, 1999 | (JP) | | 11/042389 |
| Sep. 29, 1999 | (JP) | | 11/277099 |
| Jan. 31, 2000 | (JP) | | 2000/021596 |

(51) Int. Cl.
G06F 7/60 (2006.01)

(52) U.S. Cl. .............. 703/2; 345/420; 700/98
(58) Field of Classification Search ............ 703/2, 703/3; 345/419, 420; 700/98
See application file for complete search history.

(56) References Cited

U.S. PATENT DOCUMENTS

| | | | | |
|---|---|---|---|---|
| 4,961,154 A | * | 10/1990 | Pomerantz et al. | 345/419 |
| 5,237,647 A | * | 8/1993 | Roberts et al. | 345/419 |
| 5,727,138 A | * | 3/1998 | Harada | 345/420 |
| 5,894,310 A | * | 4/1999 | Arsenault et al. | 345/679 |
| 6,313,836 B1 | * | 11/2001 | Russell et al. | 345/419 |

FOREIGN PATENT DOCUMENTS

| | | |
|---|---|---|
| FR | 2553039 | 4/1985 |
| JP | 8304114 | 11/1983 |
| JP | 1046496 | 2/1989 |
| JP | 2253309 | 10/1990 |
| JP | 02303900 | 12/1990 |
| JP | 4329470 | 11/1992 |
| JP | 5020227 | 1/1993 |
| JP | 7023123 | 1/1995 |
| JP | 8235115 | 9/1996 |
| JP | 9231413 | 9/1997 |

(Continued)

*Primary Examiner*—Albert W. Paladini
(74) *Attorney, Agent, or Firm*—Pillsbury Winthrop Shaw Pittman LLP

(57) ABSTRACT

For an apparatus effectively providing a real three-dimensional model to a customer, three-dimensional shape data of a target is obtained at a data input section (10). The data is managed by a server which is connected to a network. A suitable formation section (14) is selected to form a real three-dimensional model based on the data. In addition, the formation completion is automatically notified to the customer via a completion display panel (260), a cellular phone (61), or the like.

50 Claims, 16 Drawing Sheets

FOREIGN PATENT DOCUMENTS

| | | |
|---|---|---|
| JP | 9270789 | 10/1997 |
| JP | 09311707 | 12/1997 |
| JP | 1004022 | 2/1998 |
| JP | 10124704 | 5/1998 |
| JP | 10164484 | 6/1998 |
| JP | 10198824 | 7/1998 |
| JP | 10269447 | 10/1998 |
| JP | 10320589 | 12/1998 |
| JP | 11019335 | 1/1999 |
| JP | 11028643 | 2/1999 |

* cited by examiner

TEMPLATES

ACTUATOR

3-D MODEL PROVIDING DEVICE

This application is the national phase of international application PCT/JP00/00929 filed 18 Feb. 2000 which designated the U.S. and that international application was not published under PCT Article 21(2) in English.

TECHNICAL FIELD

The present invention relates to a three-dimensional modeling apparatus for supplying a three-dimensional model of the target based on three-dimensional shape data of a target.

BACKGROUND ART

Various types of three-dimensional scanners have been known for years, which can be used to obtain three-dimensional shape data of various types of objects. Engraving machines which are driven based on the three-dimensional shape data are also available. A real three-dimensional model can be produced using such an engraving machine.

A system is known in which three-dimensional shape data of a target such as a person or a statue is obtained by irradiating laser ray on the target and producing the target using the engraving machine.

However, no apparatus for producing a real three-dimensional model and providing the model to a customer is commercially available yet. One of the problems of such an apparatus is that a long period of time is required from the input of the three-dimensional shape data to the production of the real three-dimensional model to such an extent that it was impossible to prepare the model without making the customer feel unpleasant. Moreover, there has been no proposal of any preferable means for notifying the customer of the completion of the model production. Furthermore, there has been no method for managing the considerable amounts of three-dimensional shape data and for effectively and efficiently showing the data to the customer.

DISCLOSURE OF INVENTION

The present invention is conceived to solve the above described problem and one object of the present invention is to provide a practical system for effectively and efficiently providing a real three-dimensional model and three dimensional shape data to a customer.

In order to achieve the object described above, according to one aspect of the present invention, there is provided a three-dimensional modeling apparatus for supplying a three-dimensional model of a target to a customer. This apparatus comprises an input section for inputting three-dimensional shape data of the target; a formation section for forming a real three-dimensional model based on the obtained three-dimensional shape data; and a recording medium issuing section for issuing a recording medium in which information can be written to or read from, when the three-dimensional shape data is input, wherein the recording medium can be read by the three-dimensional modeling apparatus and/or a third-party apparatus other than the three-dimensional modeling apparatus.

According to another aspect of the present invention, it is preferable that the recording medium is capable of recording data identification information.

According to another aspect of the present invention, it is preferable that the recording medium allows new information to be written by the three-dimensional modeling apparatus and/or an third-party apparatus other than the three-dimensional modeling apparatus.

According to another aspect of the present invention, it is preferable that the third-party apparatus is an entertainment device and that the new information is a score of the entertainment provided by the entertainment device, the score being evaluated by the entertainment device.

According to another aspect of the present invention, it is preferable that the apparatus further comprises a recording medium information re-input section for re-reading new information from the recording medium, the new information written by the third-party apparatus.

According to another aspect of the present invention, it is preferable that the formation parameters are changed based on the information input from the recording medium information re-input section and a real object model is formed from the changed formation parameters.

According to another aspect of the present invention, it is preferable that three-dimensional shape data which is input by the input section is recorded on the recording medium.

According to another aspect of the present invention, it is preferable that the third-party apparatus is an entertainment device which reads three-dimensional shape data recorded on the recording medium and executes an entertainment program of the entertainment device.

In order to achieve the objects described above, according to another aspect of the present invention, there is provided a three-dimensional modeling apparatus for supplying a three-dimensional model of a target to a customer, the apparatus comprising an input section for inputting three-dimensional shape data of the target; a formation section for forming a real three-dimensional model based on the obtained three-dimensional shape data; a communication section which can communicate with the three-dimensional modeling apparatus and/or a third-party apparatus other than the three-dimensional modeling apparatus via a network; and a formation process progress information transmitting section for transmitting progress information of the formation process at the formation section to the apparatus.

According to another aspect of the present invention, it is preferable that the formation process progress information of the formation section includes formation completing time information and the time information is displayed at a display section provided on the apparatus.

According to another aspect of the present invention, it is preferable that the communication section receives the information at the apparatus and changes parameters for forming the real three-dimensional model based on the information, and that the formation section forms the real three-dimensional model based on the changed parameters.

According to another aspect of the present invention, it is preferable that the three-dimensional shape data is transmitted to the apparatus via the communication section.

According to another aspect of the present invention, it is preferable that the apparatus is an entertainment device and that the transmitted three-dimensional model shape data is used by the entertainment device.

In order to achieve the object described above, according to another aspect of the present invention, there is provided a three-dimensional modeling apparatus for supplying a three-dimensional model of a target to a customer, the apparatus comprising an input section for inputting three-dimensional shape data of the target; a formation section for forming a real three-dimensional model based on the obtained three-dimensional shape data; a contacting means input section for inputting information contacting means for the customer; and an information notifying section for notifying modeling information to the information contacting means.

According to another aspect of the present invention, it is preferable that the information contacting means for the customer is a cellular phone, the phone number for the cellular phone is input at the contacting means input section, and the modeling information is progress information of the formation process at the formation section.

According to another aspect of the present invention, it is preferable that the information contacting means for the customer is electronic mail, the mail address for the electric mail is input at the contacting means input section, and the modeling information is formation completion information.

According to another aspect of the present invention, it is preferable that the modeling information is identification information for accessing a server which stores the three-dimensional shape data, in addition to being the formation completion information.

According to another aspect of the present invention, it is preferable that the modeling information is three-dimensional shape data.

According to another aspect of the present invention, it is preferable that the apparatus further comprises an estimated completion time display section for displaying the shortest estimated time for the formation completion and a formation completion time specifying section for specifying a time after the shortest formation completion time, wherein a schedule for the formation process is determined to accommodate the completion time indicated at the formation completion time specifying section by the customer.

According to another aspect of the present invention, it is preferable that the apparatus further comprises a process start receiving section for receiving start time for the formation process, wherein the formation process is started according to the start time indicated by the customer.

According to another aspect of the present invention, it is preferable that the apparatus further comprises an address means input section for inputting delivery destination address for the real three-dimensional model; and a delivery destination printing section for printing the delivery destination address.

According to another aspect of the present invention, it is preferable that the apparatus further comprises a formation section selecting section, connected to a plurality of formation sections via a network, for selecting a suitable formation section based on the input address, wherein the three-dimensional shape data is transmitted to the selected formation section.

According to another aspect of the present invention, it is preferable that the apparatus further comprises a communication section which can communicate with a database section for storing the three-dimensional shape data via a network, wherein the three-dimensional shape data is recorded at the database section.

According to another aspect of the present invention, it is preferable that the apparatus further comprises a three-dimensional shape data synthesizing section for reading three-dimensional shape data pre-stored in the database section and generating new three-dimensional shape data obtained by integrating a plurality of three-dimensional shape data.

According to another aspect of the present invention, it is preferable that the apparatus further comprises a plurality of formation sections, and a server section for managing the three-dimensional shape data input from the input section, wherein the formation section is selected at the server section for assigning the three-dimensional shape data input from the input section.

According to another aspect of the present invention, it is preferable that the selection of the formation section is performed based on the operation conditions at the plurality of formation sections.

According to another aspect of the present invention, it is preferable that the apparatus further comprises a parameter specifying section for the customer to specify the material or size of the object to be formed, wherein the selection of the formation section is performed based on the parameters specified at the parameter specifying section.

According to another aspect of the present invention, it is preferable that at least two of the input section, formation section, and server section are connected via a network.

According to another aspect of the present invention, it is preferable that the apparatus further comprises a display section for displaying an image of the three-dimensional shape data seen from an arbitrary point of view.

According to another aspect of the present invention, it is preferable that the apparatus further comprises a coloring section for coloring the real three-dimensional model based on the three-dimensional shape data.

According to another aspect of the present invention, it is preferable that the display section is a display device capable of three-dimensional display including stereo-scopic display.

In order to achieve the object mentioned above, according to one aspect of the present invention, there is provided a three-dimensional modeling apparatus for supplying a three-dimensional model of a target to a customer, comprising a data input section for inputting three-dimensional shape data of the target and a formation section for forming a real three-dimensional model based on the obtained three-dimensional shape data, wherein the real three-dimensional model comprises a plurality of parts, and a portion of the parts are selected from among a plurality of pre-provided components based on the measured three-dimensional shape data of the target.

According to another aspect of the present invention, it is preferable that the selected component is further processed.

According to another aspect of the present invention, it is preferable that the real three-dimensional model is constructed from at least three parts, the first and second parts are constructed from an identical first material, the third part is constructed from a material different from the first material, three-dimensional shape data which correspond to at least the first part is input at the input section, the first part is formed at the formation section based on the input three-dimensional shape data, and the formed first and second parts and second and third parts are respectively integrated by joining respective parts together.

In order to achieve the object described above, according to another aspect of the present invention, there is provided a three-dimensional modeling apparatus for supplying a three-dimensional model of a target to a customer, the apparatus comprising an input section for inputting three-dimensional shape data of the target; a recording section for recording a plurality of three-dimensional shape data which are input from the input section; an identification number input section for inputting an identification number which is used for displaying the recorded three-dimensional shape data; an identification number judging section for judging the input identification number; and a data outputting section for outputting the recorded three-dimensional shape data.

According to another aspect of the present invention, it is preferable that the data can be displayed from viewpoints within a predetermined range for the display process of the three-dimensional shape data at the data outputting section.

According to another aspect of the present invention, it is preferable that there be a plurality of the predetermined points of view, that, based on the identification number, one point of view is selected from among the plurality of predetermined points of view, and that the three-dimensional shape data is displayed at the data outputting section based on the selected point of view.

According to another aspect of the present invention, it is preferable that the apparatus further comprises a modifying section for reading and modifying the three-dimensional shape data recorded at the recording section, and for recording the modified data to the recording section.

According to another aspect of the present invention, it is preferable that at least two of the input section, recording section, identification number input section, identification number judging section, data outputting section, and modifying section are connected via a network.

According to another aspect of the present invention, it is preferable that the data outputting section is a display device capable of three-dimensional display including stereo-scopic display.

According to another aspect of the present invention, it is preferable that the target is a person, voice of the target person is also input at the input section, the voice is recorded at the recording section in addition to the three-dimensional shape data, and the data outputting section is capable of outputting the three-dimensional shape data and/or the voice.

According to another aspect of the present invention, it is preferable that a plurality of face expressions are input at the input section for one person, the recording section records the plurality of face expressions, and the display/outputting section is capable of sequentially displaying the plurality of face expressions in response to directions by the customer.

In order to achieve the object described above, according to another aspect of the present invention, there is provided a three-dimensional modeling apparatus for supplying a three-dimensional model of a target to a customer, the apparatus comprising an input section for inputting three-dimensional shape data of the target; a database section for registering the three-dimensional shape data input from the input section and its property information; and a display section for displaying the registered three-dimensional shape data.

According to another aspect of the present invention, it is preferable that the apparatus further comprises a modifying section for reading and modifying the three-dimensional shape data registered at the database section, and for re-registering the modified data to the database section.

According to another aspect of the present invention, it is preferable that a thumbnail image of each of three-dimensional shape data is registered at the database section.

According to another aspect of the present invention, it is preferable that the thumbnail image is produced by assigning a point of view for the three-dimensional shape data and obtaining a two-dimensional image seen from the assigned point of view.

According to another aspect of the present invention, it is preferable that the thumbnail image is produced by assigning a plurality of points of view for the three-dimensional shape data and obtaining a series of two-dimensional images seen from these points of view.

According to another aspect of the present invention, it is preferable that the thumbnail image is produced by selecting one of the two-dimensional images that were taken when inputting the three-dimensional shape data, and reducing the selected two-dimensional image.

According to another aspect of the present invention, it is preferable that the thumbnail image is a reduced three-dimensional shape data obtained by reducing the data in the three-dimensional shape data.

According to another aspect of the present invention, it is preferable that for each of the data registered at the database section the number of accesses are additionally registered.

According to another aspect of the present invention, it is preferable that the apparatus further comprises a charging device, wherein charge process for charge targets registered in each database is executed based on the number of accesses.

According to another aspect of the present invention, it is preferable that the apparatus further comprises a refund device, wherein refund process for refund targets registered in each database is executed based on the number of accesses.

According to another aspect of the present invention, it is preferable that the display section is a display device capable of three-dimensional display including stereo-scopic display.

According to another aspect of the present invention, it is preferable that the apparatus further comprises a motion input section for inputting motion information of the three-dimensional shape data input from the input section; a dividing section for dividing the three-dimensional shape data input from the input section into a plurality of portions; and a motion recording section for linking and recording the motion information and the plurality of divided portions.

In order to achieve the object described above, according to one aspect of the present invention, there is provided a three-dimensional model preparation method for supplying a three-dimensional model of a target to a customer via a three-dimensional modeling apparatus, the method comprising the steps of an input step for inputting three-dimensional shape data of the target; a formation step for forming a real three-dimensional model based on the obtained three-dimensional shape data; and a recording medium issuing step for issuing a recording medium in which information can be written to or read from, when the three-dimensional shape data is input; wherein the recording medium can be read by the three-dimensional modeling apparatus and/or a third-party apparatus other than the three-dimensional modeling apparatus.

According to another aspect of the present invention, it is preferable that the recording medium is capable of recording data identification information.

According to another aspect of the present invention, it is preferable that the recording medium allows new information to be written by the three-dimensional modeling apparatus and/or an third-party apparatus other than the three-dimensional modeling apparatus.

According to another aspect of the present invention, it is preferable that the method further comprises a recording medium information re-input step for re-reading a recording medium on which new information has been written.

According to another aspect of the present invention, it is preferable that the formation parameters are changed based on the information input at the recording medium information re-input step and a real object model is formed from the changed formation parameters.

According to another aspect of the present invention, it is preferable that the input three-dimensional shape data is recorded on the recording medium.

According to another aspect of the present invention, it is preferable that the third-party apparatus is an entertainment device which reads the three-dimensional shape data recorded on the recording medium and uses an entertainment program of the entertainment device.

In order to achieve the object described above, according to another aspect of the present invention, there is provided a three-dimensional model preparation method for supplying a three-dimensional model of a target to a customer via a three-dimensional modeling apparatus, the method comprising the steps of an input step for inputting three-dimensional shape data of the target; a formation step for forming a real three-dimensional model based on the obtained three-dimensional shape data; a communication step for communicating with the three-dimensional modeling apparatus and/or a third-party apparatus other than the three-dimensional modeling apparatus via a network; and a formation process progress information transmitting step for transmitting the progress information of the formation process to the other apparatus.

According to another aspect of the present invention, it is preferable that the formation process progress information at the formation step includes formation completing time information and the time information is displayed at a display section provided on the apparatus.

According to another aspect of the present invention, it is preferable that at the communication step, the information at the apparatus is received and parameters for forming the real three-dimensional model are changed based on the information, and that at the formation step, a real three-dimensional model is formed based on the changed parameters.

According to another aspect of the present invention, it is preferable that the three-dimensional shape data is transmitted to the apparatus through the communication step.

According to another aspect of the present invention, it is preferable that the apparatus is an entertainment device and the transmitted three-dimensional model shape data is used by the entertainment device.

In order to achieve the object described above, according to another aspect of the present invention, there is provided a three-dimensional model preparation method for supplying a three-dimensional model of a target to a customer via a three-dimensional modeling apparatus, the method comprising the steps of an input step for inputting three-dimensional shape data of the target; a formation step for forming a real three-dimensional model based on the obtained three-dimensional shape data; a contacting means input step for inputting information contacting means for the customer; and an information notifying step for notifying modeling information to the information contacting means.

According to another aspect of the present invention, it is preferable that the information contacting means for the customer is a cellular phone, the phone number for the cellular phone is input at the contacting means input step, and the modeling information is the progress information of formation process at the formation step.

According to another aspect of the present invention, it is preferable that the information contacting means for the customer is an electric mail, the mail address for the electric mail is input at the contacting means input step, and the modeling information is formation process completion information.

According to another aspect of the present invention, it is preferable that the modeling information is, in addition to being the formation completion information, identification information for accessing a server which stores the three-dimensional shape data.

According to another aspect of the present invention, it is preferable that the modeling information is three-dimensional shape data.

According to another aspect of the present invention, it is preferable that the method further comprises the steps of an estimated completion time display step for displaying the shortest estimated time for the formation completion and a formation completion time specifying step for specifying a time after the shortest formation completion time, wherein a schedule for the formation process is determined to accommodate the completion time indicated at the formation completion time specifying step by the customer.

According to another aspect of the present invention, it is preferable that the method further comprises a process start receiving step for receiving start time for the formation process, wherein the formation process is started according to the start time indicated by the customer.

According to another aspect of the present invention, it is preferable that the method further comprises the steps of an address means input step for inputting delivery destination address for the real three-dimensional model and a delivery destination printing step for printing the delivery destination address.

According to another aspect of the present invention, it is preferable that the method further comprises a formation section selecting step for selecting a suitable formation section based on the input address from among a plurality of forming sections connected via a network, wherein the three-dimensional shape data is transmitted to the selected formation section.

According to another aspect of the present invention, it is preferable that the method further comprises a communication step for communicating with a database section via a network, wherein the three-dimensional shape data is recorded at the database section.

According to another aspect of the present invention, it is preferable that the method further comprises a three-dimensional shape data synthesizing step for reading three-dimensional shape data stored in the database section and for generating new three-dimensional shape data obtained by integrating a plurality of three-dimensional shape data.

According to another aspect of the present invention, it is preferable that the method further comprises a managing step for managing the three-dimensional shape data input at the input step, wherein one formation section is selected from among a plurality of formation sections at the managing step for assigning the three-dimensional shape data input at the input step.

According to another aspect of the present invention, it is preferable that the selection of the formation section is performed based on the operation conditions at the plurality of formation sections.

According to another aspect of the present invention, it is preferable that the method further comprises a parameter specifying step for the customer to specify the material or size of the object to be formed, wherein the selection of the formation section is performed based on the parameters specified at the parameter specifying step.

According to another aspect of the present invention, it is preferable that data transmission/reception between at least a pair of the input step, formation step, and managing step are performed via a network.

According to another aspect of the present invention, it is preferable that the method further comprises a display step for displaying an image of the three-dimensional shape data seen from an arbitrary point of view.

According to another aspect of the present invention, it is preferable that the method further comprises a coloring step for coloring the real three-dimensional model based on the three-dimensional shape data.

In order to achieve the object described above, according to another aspect of the present invention, there is provided a three-dimensional modeling method for supplying a three-dimensional model of a target to a customer, the method comprising the steps of a data input step for inputting three-dimensional shape data of the target and a formation step for forming a real three-dimensional model based on the obtained three-dimensional shape data, wherein the real three-dimensional model comprises a plurality of parts, and a portion of the parts is selected from among a plurality of pre-provided components based on the measured three-dimensional shape data of the target.

According to another aspect of the present invention, it is preferable that the selected component is further processed.

According to another aspect of the present invention, it is preferable that the real three-dimensional model is constructed from at least three parts, the first and second parts are constructed from an identical first material, the third part is constructed from a material different from the first material, three-dimensional shape data which correspond to at least the first part is input at the input step, the first part is formed at the formation step based on the input three-dimensional shape data, and the formed first and second parts and second and third parts are respectively integrated by joining respective parts together.

In order to achieve the object described above, according to another aspect of the present invention, there is provided a three-dimensional modeling method for supplying a three-dimensional model of a target to a customer, comprising the steps of an input step for inputting three-dimensional shape data of the target; a recording step for recording a plurality of three-dimensional shape data which are input at the input step; an identification number input step for inputting an identification number which is used for displaying the recorded three-dimensional shape data; an identification number judging step for judging the input identification number; and a data display/outputting step for displaying/outputting the recorded three-dimensional shape data.

According to another aspect of the present invention, it is preferable that the data can be displayed from viewpoints within a predetermined range at the display/outputting step of the three-dimensional shape data.

According to another aspect of the present invention, it is preferable that there are a plurality of the predetermined points of view, a point of view is selected based on the identification number, and the three-dimensional shape data is displayed at the data display/outputting step based on the selected point of view.

According to another aspect of the present invention, it is preferable that the method further comprises a modifying step for reading and modifying the three-dimensional shape data recorded at the recording section, and for writing the modified data to the recording section.

According to another aspect of the present invention, it is preferable that data transmission/reception between at least a pair of the input step, recording step, identification number input step, identification number judging step, data display/outputting step, and modifying step are performed via a network.

According to another aspect of the present invention, it is preferable that the target is a person, voice of the target person is also input at the input step, the voice is recorded at the recording step in addition to the three-dimensional shape data, and the voice is also displayed with the three-dimensional shape data at the data display/outputting step.

According to another aspect of the present invention, it is preferable that a plurality of face expressions are input at the input step for one person, the plurality of face expressions are recorded at the recording step, and the plurality of face expressions are sequentially displayed at the display/outputting step in response to directions by the customer.

In order to achieve the object mentioned above, according to one aspect of the present invention, there is provided a three-dimensional modeling method for supplying a three-dimensional model of a target to a customer, the method comprising the steps of an input step for inputting three-dimensional shape data of the target; a data managing step for registering the three-dimensional shape data input at the input step and its property information; and a display step for displaying the registered three-dimensional shape data.

According to another aspect of the present invention, it is preferable that the method further comprises the step of a modifying step for reading and modifying the three-dimensional shape data registered at the data managing step, and for re-registering the modified data.

According to another aspect of the present invention, it is preferable that a thumbnail image of each of three-dimensional shape data is also registered at the data managing step.

According to another aspect of the present invention, it is preferable that the thumbnail image is produced by assigning a point of view for the three-dimensional shape data and obtaining a two-dimensional image seen from the assigned point of view.

According to another aspect of the present invention, it is preferable that the thumbnail image is produced by selecting one of the two-dimensional images that were taken when inputting the three-dimensional shape data, and reducing the selected two-dimensional image.

According to another aspect of the present invention, it is preferable that for each of the registered data the number of accesses be additionally registered.

According to another aspect of the present invention, it is preferable that the method further comprises a charging step, wherein a charge target is registered at the data managing step, and charge process for the recorded charge target is executed based on the number of accesses.

According to another aspect of the present invention, it is preferable that the method further comprises a refund step, wherein a refund target is registered at the data managing step and refund process for the registered refund target is executed based on the number of accesses.

According to another aspect of the present invention, it is preferable that the method further comprises the steps of a motion input step for inputting motion information of the three-dimensional shape data input at the input step; a dividing step for dividing the three-dimensional shape data input at the input step into a plurality of portions; and a motion recording step for linking and recording the motion information and the plurality of divided portions.

BEST MODE FOR CARRYING OUT THE INVENTION

Figure 1:
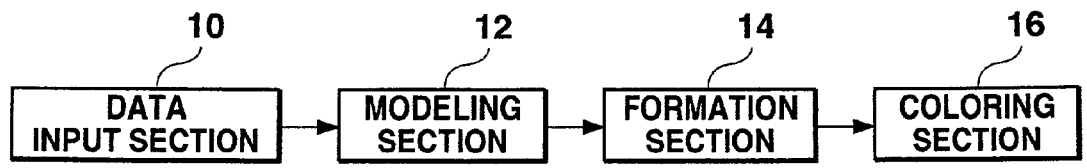
FIG. 1 is a block diagram showing a structure of the present invention configured according to one preferred embodiment.

Preferred embodiments of the present invention will now be described referring to the drawings.

Figure 2:
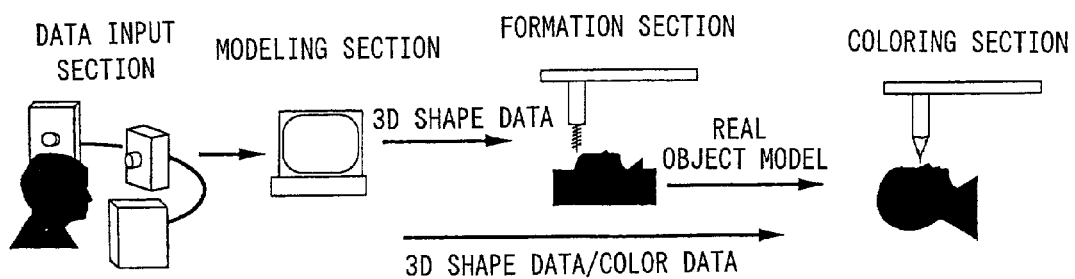
FIG. 2 is a conceptual diagram showing a structure of the present invention in the preferred embodiment.

FIGS. 1 and 2 show a structure of a real three-dimensional model generating apparatus according to a first preferred embodiment of the present invention.

A data inputting section 10 captures a target such as a person or the face of a person, and produces an image data. The data inputting section 10 includes a plurality of color CCD cameras, as shown in FIG. 2, and obtains color image data of the target at a plurality of positions.

The color image data including the color information obtained by the data inputting section 10 is then input to a modeling section 12. The modeling section 12 includes a personal computer or the like, and performs three-dimensional modeling based on the plurality of image data of the target captured at the plurality of positions, to thereby obtain three-dimensional shape data of the target.

The three-dimensional shape data includes the color data of the target. For the three-dimensional modeling, any method can be used such as, for example, the method disclosed in Japanese Patent Laid-Open Publication No. Hei 10-124704.

The obtained three-dimensional shape data is input to a forming section 14. The forming section 14 is, for example, a milling drill which can move with respect to three axis such as xyz, and mills a work to produce a real three-dimensional model based on the input three-dimensional shape data.

The obtained real three-dimensional model is then supplied to a coloring process section 16. The coloring process section is for coloring the real three-dimensional model, and when the target is a person, colors at least the eyes and the mouth.

As described, in this embodiment, the image data is obtained by capturing the target using cameras. Thus, it is safe even when the target is a person. Moreover, color data is obtained for coloring at the coloring process section. Because of this, a real three-dimensional model can be produced which includes color information, and thus, contains unique characteristics.

In the following description, the term "three-dimensional shape data" refers to data on the three-dimensional shape information of the target, and may include the color information. The three-dimensional shape data is obtained by inputting an image at the data inputting section and performing a modeling process at the modeling section. When the data inputting section is a three-dimensional shape measurement device, the three-dimensional shape data may be obtained at the data inputting section. Moreover, data which is obtained by changing, modifying, integrating, and/or processing the obtained three-dimensional shape data is also referred to as the three-dimensional shape data.

The term "real three-dimensional model", on the other hand, refers to a three-dimensional object produced at the forming section based on the obtained three-dimensional shape data. The "real three-dimensional model" also includes the real three-dimensional model as defined above, colored at the coloring process section.

The term "three-dimensional data" is used interchangeably with the term "three-dimensional shape data" (which may include the color information). A term "pseudo-three-dimensional data", on the other hand, refers to data which does not contain the three-dimensional shape information of the target but which can display the target in virtual three-dimension. One example of pseudo-three-dimensional data is QuickTime VR data. The term "three-dimensional model" refers to both a real three-dimensional model and to three-dimensional data as defined above.

"Structure of the Data Inputting Section and the Modeling Section"

The data inputting section 10 uses cameras to capture a target. Generally, in order to obtain three-dimensional shape data, a plurality of image data from a plurality of directions are necessary for each immovable target. Therefore, it is preferable to fix a plurality of cameras at predetermined positions to simultaneously capture the target. However, it is also possible to movably mount a camera on a structure such as a rail and obtain a plurality of image data by moving the camera.

Figure 3:
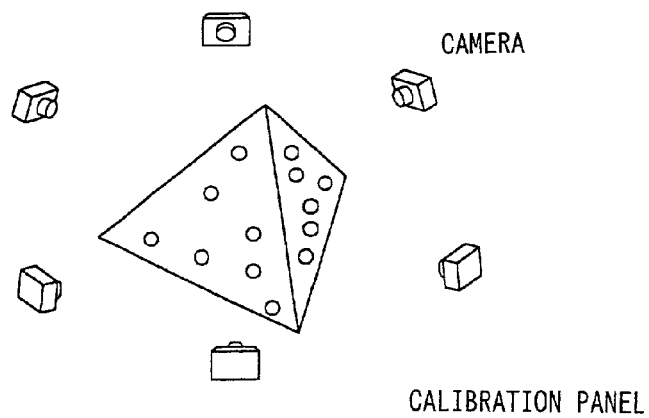
FIG. 3 is a diagram showing calibration.

The absolute positions of the plurality of the fixed cameras must be precisely determined, but in general this may be difficult with the mechanical means. Therefore, it is preferable to perform calibration of the camera positions by placing a reference object with a predetermined pattern in the camera view and calibrate the camera position based on the image data of the reference object, as shown in FIG. 3. In this manner, the mounting of the cameras itself can be simplified and, at the same time, their positions can be precisely detected. It is preferable to perform the calibration periodically, e.g., on an everyday basis, or on an every week basis.

Figure 4:
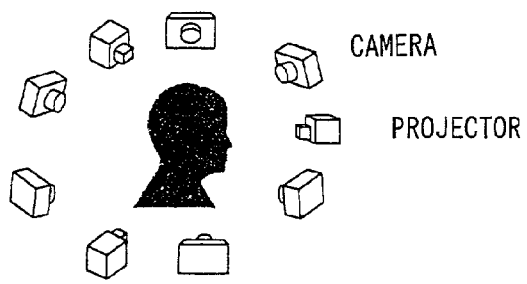
FIG. 4 is a diagram showing a structure for projecting a random pattern.
Figure 5:
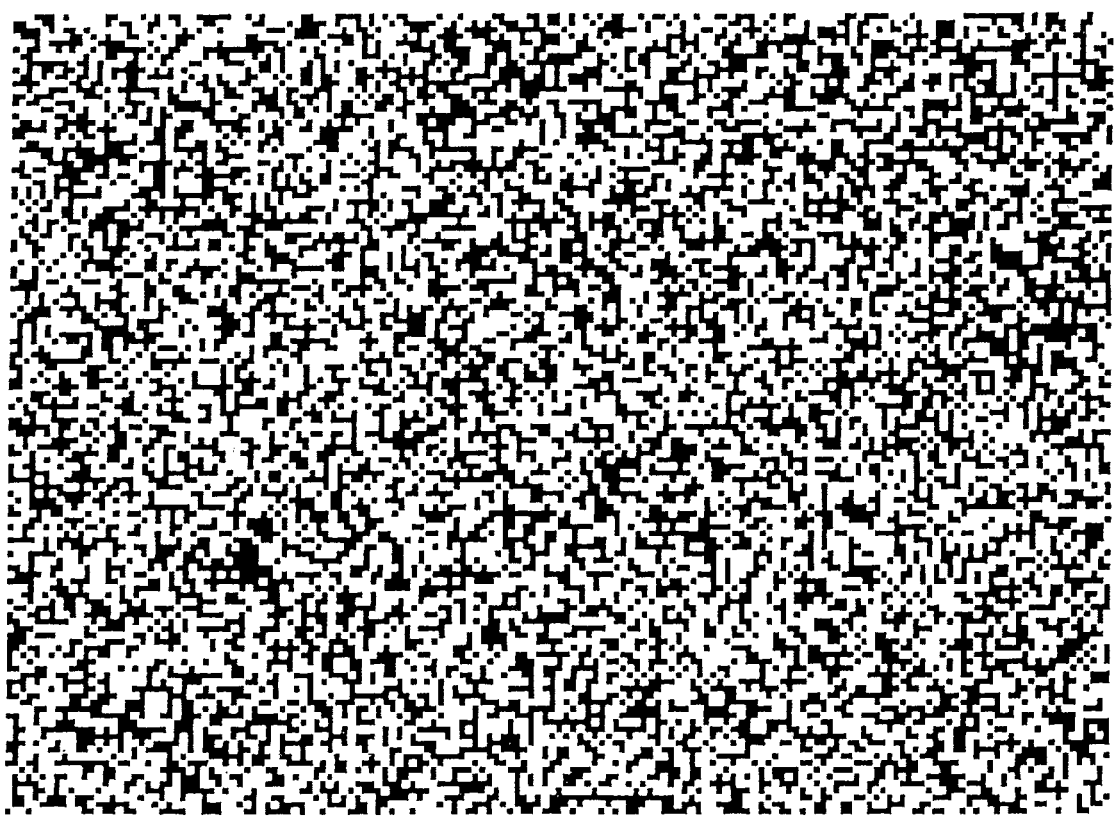
FIG. 5 is a diagram exemplifying a random pattern.

In order to precisely obtain three-dimensional shape data or the like of a target, each of the sections of the target must be seen differently from a plurality of directions. Therefore, it is preferable to project a predetermined pattern on the target using a projector as shown in FIG. 4. In this manner, precise three-dimensional shape data can be obtained even for sections with uniform colors or where there is little change in color. The pattern can be removed from the color data by data processing or, alternatively, the color data can be obtained from the image data without the pattern projected. A random pattern as shown in FIG. 5, for example, can be used as the projection pattern.

When obtaining three-dimensional shape data using such a random pattern, by obtaining depth data by a stereo method using a plurality of cameras, a high precision modeling is possible even for a recess section.

For the camera, it is preferable to use a camera with a wide-angle lens. By using such cameras, the cameras can be placed in relatively small spaces.

The data inputting section 10 captures the target by the cameras and extracts the target area in the image. It is therefore preferable to make the background a constant color to facilitate extraction of the target area in the image.

For example, it is preferable to provide a room with the four walls colored in one color and to place the target at the center of the room. In particular, when the target is a person, it is preferable to place a chair at the center of the room and let the person (target) sit on the chair. When the target is a person, the image captured from the back is usually of less importance.

Therefore, it is preferable to provide an entrance at one wall of the room, have the person sit facing the entrance, and to unify the color of the walls other than the wall with the entrance. It is also preferable to omit the image data from the back when the target is a person.

Furthermore, when the target has a color identical to the background color, extraction can not be performed correctly. Therefore, it is preferable to configure the room so that the background color (the wall color of the room) is changeable. For example, by using a projector, light of a predetermined color can be projected onto the wall, to thereby change its color.

It is also preferable to use at least two colors for the background color, obtain image data with two types of background color, and extract the target area by the union of the extraction results from the two background colors. In this manner, precise extraction of the target area can be accomplished for any target of any color.

It is also preferable to provide lighting apparatuses at the corners of the room for uniform lighting effect on the target and light up the room so that there will be no shadow on the target.

"Structure of the Forming Section"

The forming section 14 produces a real three-dimensional model based on the three-dimensional shape data. As the forming section 14, a milling drill capable of three-dimensional processing can be used, as described before. When the target is the face of a person, a process with only one drill axis direction is also possible. However, in order to precisely process the nostril or the like, it is preferable to use a processing device which can also perform rotation of the drill axis direction.

The material to be used as the basis for the real three-dimensional model includes a scantling and a round bar. However, when the target is known to some extent, for example, when the target is a human face, it is preferable to prepare a template (a prototype of the work to be processed) which resembles the shape of the target and process the template. In this manner, the time required for the process can be reduced. Moreover, various types of templates can be prepared, as shown in FIG. 6, and a template closely resembling the obtained three-dimensional shape data can be selected for process.

Figure 6:
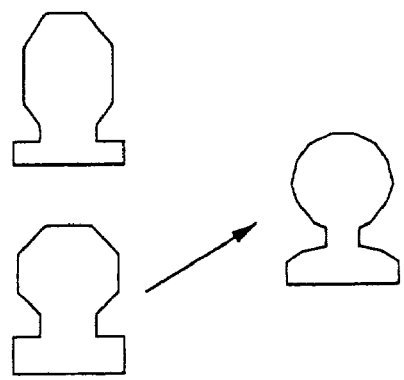
FIG. 6 is a diagram showing usage of a template.

In the example shown in FIG. 6, a template for a round face and a template for thin face are separately prepared, and a suitable template can be selected depending on the face of the target and processed. In this manner, processing can be facilitated and the processing time can be further reduced. Moreover, by using such a template, the amount of waste generated during milling can also be reduced. Furthermore, it is also possible to modify the obtained three-dimensional shape data by morphing so that the data more closely resembles the shape of the selected template and to process the template, resulting in further reduction of the processing time.

For the portion corresponding to the hair, it is possible to use a pre-provided template without processing. Specifically, the hair is not usually as important, and it is likely that a template chosen from few types of pre-provided templates is sufficient. Therefore, by preparing few types of templates for the hair portion, it is possible to select and use from among the prepared templates. It is also possible to separately prepare the templates for the hair portion and the templates for the face portion.

In this case, the hair portion can be colored in black. In this manner, coloring process for the hair portion can be omitted. Even when coloring process must be performed, by separately coloring the hair portion, the overall coloring procedure can be simplified. It is preferable that the hair portion is formed so that it is applied to the face portion by covering on the upper section of the face, similar to a wig. It is also possible to form the hair portion as a wig with a thread as the hair.

Figure 7:
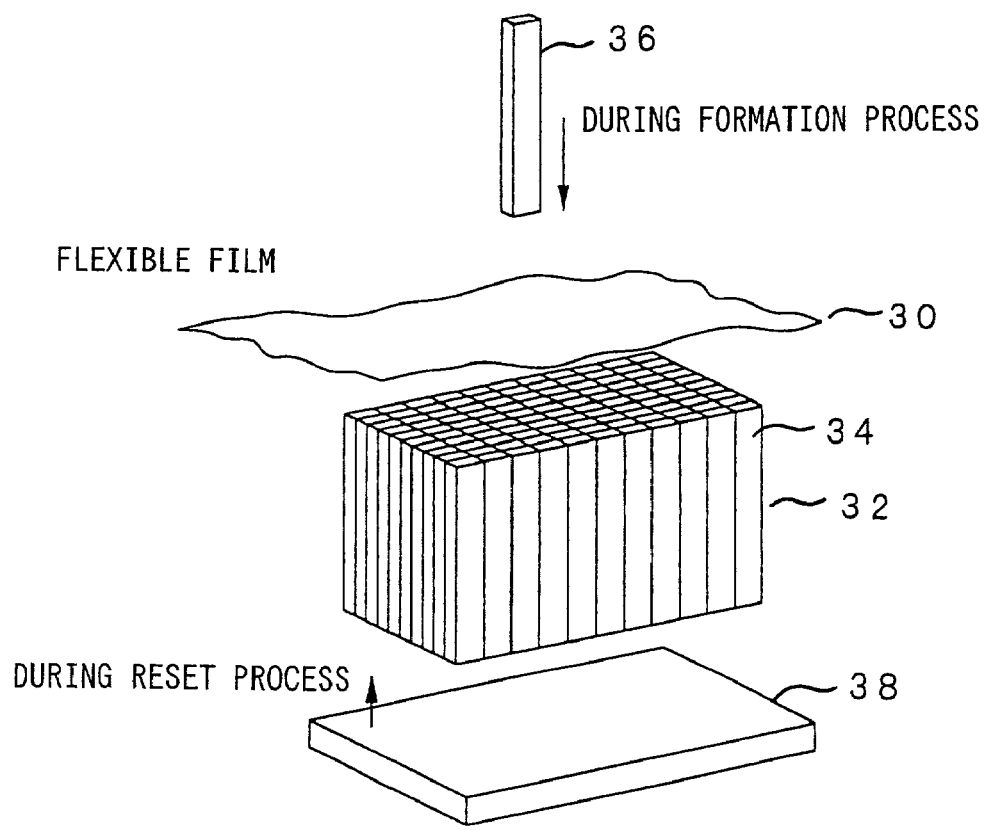
FIG. 7 is a diagram showing a structure of a forming mold.
Figure 8:
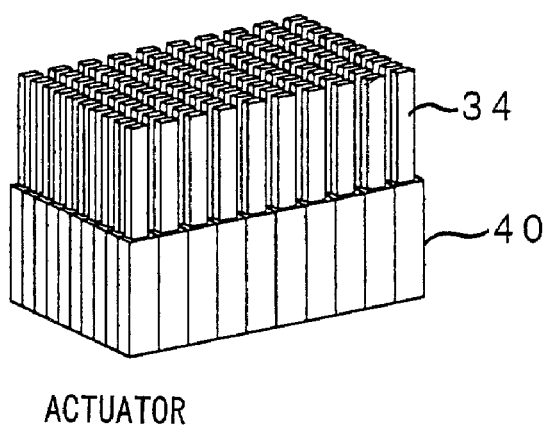
FIG. 8 is a diagram showing another exemplary structure of a forming mold.

It is also possible to generate a forming mold and produce a real three-dimensional model using the mold. FIG. 7 shows a forming mold using a flexible film 30 and a pin assembly 32. The pin assembly 32 is constructed from a plurality of pins 34, each of which is movable and fixable. As shown in the figure, by determining the positions of one or more of pins 36 by an actuator and applying the pin(s) 36 via the flexible film 30, the positions for each of the pins 34 of the pin assembly 32 can be set. Once the shape of the pin assembly 32 is determined, the shape of the flexible film 30 which covers the pin assembly is also determined.

It is also possible to create a forming mold by constructing an object with the pin assembly 32, in which the positions of pins 34 are fixed, and the flexible film 30, and generate a real three-dimensional model by filling a material into the forming mold and solidifying the material. By forming a mold in this manner, a plurality of real three-dimensional models can be easily produced.

For example, by using a heat-resistive film as the flexible film 30, a thermosetting resin can be used as the material for formation by heating.

By applying a reset plate 38 from the opposite side of the pin assembly 32, the pins 34 of the pin assembly 32 pushed by the pin 36 can be returned to their original positions and be ready for the next formation. When the shape of the target is known to some extent, such as when the target is a human face, it is also preferable to set the shape of the reset plate 38 into a shape corresponding to a general shape corresponding to the target in order to set the default shape of the pin assembly 32 close to the final shape of the target.

The pins 34 of the pin assembly 34 need not be facing the same direction. It is also possible to set an axial direction for each pin and place the pins according to the set directions, in order to support a curved shape.

In the example shown in FIG. 7, the pins are passively moved. However, it is also possible to provide an actuator 40 corresponding to each pin 34 and control the shape of the pin assembly 32 by driving a plurality of the actuators 40. In this case, it is also preferable to provide a flexible film 30 on top of the pins 34.

Figure 9:
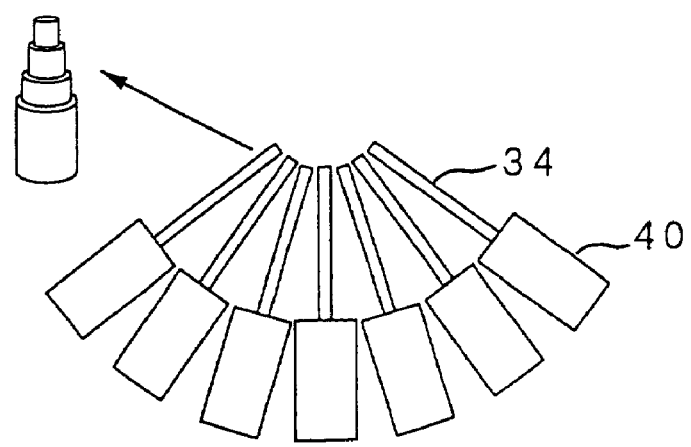
FIG. 9 is a diagram showing yet another exemplary structure of a forming mold.

FIG. 9 shows an example where each of the pins 34 are provided in a shape corresponding to a sphere. By arranging the pins 34 in this manner, each pin 34 extends radially outward and actuators 40 are placed thereon. By doing so, the space for placing each actuator 40 can be broadened and, at the same time, the density of the head of the pins 34 can be increased.

The above configuration is further preferable because a human face resembles a sphere. The shape of the group of heads of the pins 34 need not be shaped into a perfect sphere, and can be any suitable arrangement based on the shape of the target.

With this arrangement, it is also possible to individually determine the positions of the heads of the pins 34 by individually driving the actuators 40, in order to shape the flexible film 30 supported by the pins 34 into a desired shape. Thus, formation of a real three-dimensional model with a desired shape can be achieved.

When forming, instead of using the three-dimensional shape data in its original form, it is also possible to shrink the scale of the three-dimensional shape data along the depth axis and form a real three-dimensional model based on the compressed data. A relief-type real three-dimensional model can be produced. The relief-type real three-dimensional model is easier to form, and the milling waste due to usage of an engraving machine can be reduced.

It is also preferable to extract a characteristic portion of the target and form a model accordingly. For example, by applying an edge exaggerating process on the three-dimensional shape data, the characteristic portion of the three-dimensional shape data can be exaggerated. By producing a real three-dimensional model with the characteristic portion exaggerated, a real three-dimensional model which accurately capture the characteristics of the target can be obtained.

It is also possible to produce the forming mold using clay or the like. In this case, the clay or the like can be recycled.

"Structure of Coloring Process Section"

The coloring process section 16 applies coloring process on the real three-dimensional model according to the color data. Various methods exist for the coloring process, and these methods will be described below.

Figure 10:
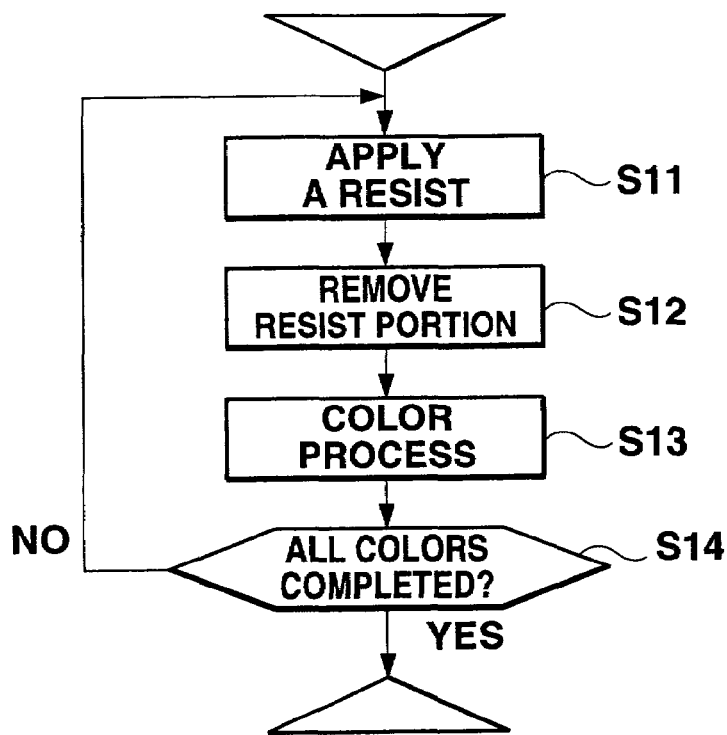
FIG. 10 is a flowchart showing the coloring process using a resist.

First, a resist can be applied on the real three-dimensional model and coloring process can be performed using the resist. This method will be described referring to FIG. 10. A resist is applied on the surface of the real three-dimensional model (step S11). When the target is a human face, it is only necessary to color the face, and thus, in such a case, the face portion is the only target for the coloring process. Then, using a predetermined pattern, by exposing the necessary portion or by thinly milling the necessary portion with a drill or the like, the resist on the necessary portion is partially removed (step S12). The partial removal is performed for the portion to be colored for each color. Coloring process for a color is then performed on the removed portion (step S13).

It is then judged whether coloring process for all the colors are completed (step S14). If not, the procedure returns to step S11 and performs coloring process for the next color. Here, by using a material that repels the paint used for coloring, selective coloring on the portion where the resist is removed is possible. Because the resist is fairly thin, it does not cause a problem even if the portion of the resist which is not removed is left on the model. It is preferable to cover the entire model with a durable protection film after all the coloring processes are completed. In this method, it is better to minimize the number of colors. Accordingly, if the target is a human face, it is preferable to simplify the process to some extent by, for example, coloring the eyes with a black color and lips with a red color.

When the above described coloring method is employed, there is a limit on the number of colors for coloring the target. Therefore, there is a need for a reducing process to reduce the number of colors in the original color data included in the obtained image data. Preferable reduction can be accomplished by, for example, a process with the following steps:

1. Divide the obtained image data into regions,
2. Obtain the average color value within one region,
3. Compare the average color value with all the prepared available colors for each region to obtain the available color closest to the average color value, and
4. Replace the color within the region by the available color determined at step 3.

Figure 11:
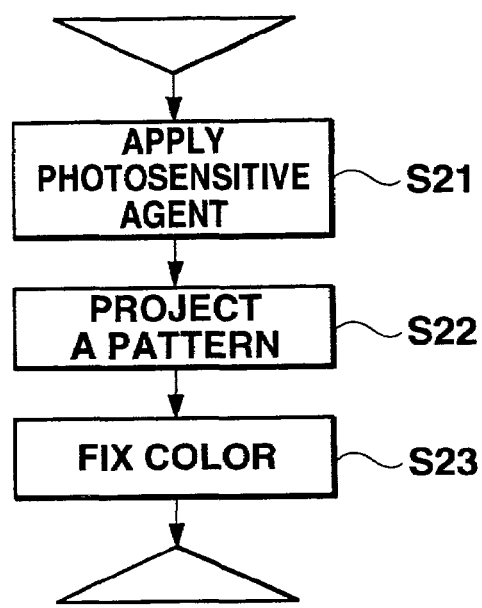
FIG. 11 is a flowchart showing the coloring process using a photosensitive agent.

It is also preferable to use a photosensitive agent for the coloring process. This method will be described with reference to FIG. 11. First, a photosensitive agent is applied on the real three-dimensional model (step S21). Then, a pattern is projected based on the color data to expose the photosensitive agent (step S22).

Figure 12:
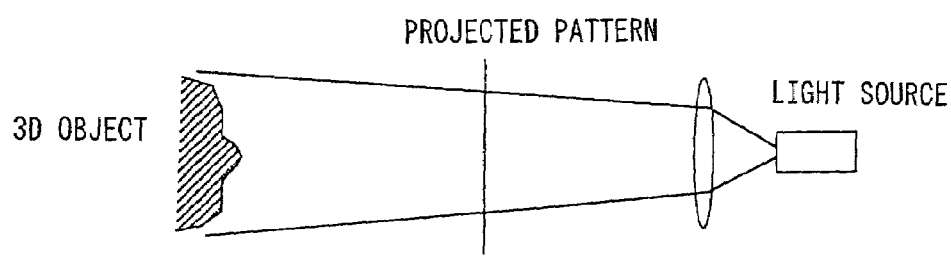
FIG. 12 is a diagram showing a structure for pattern projection.

A fixing process is applied to the photosensitive agent to fix the color (step S23). The pattern projection can be achieved, as shown in FIG. 12, by irradiating light from a light source onto a real three-dimensional model (three-dimensional object), with the photosensitive agent applied, via an projection pattern. The projection pattern can be, for example, a transmission type liquid crystal panel.

It is also possible to directly project a pattern from a CRT on the real three-dimensional model. In this example, the three-dimensional model is a face, and, thus, the exposure is performed with a single irradiation from the front side. In particular, by using a long focal length lens to ensure a sufficient focus depth even for a three-dimensional object, exposure of the entire face portion (hemisphere) can be performed using one projection pattern.

Shrinking the scale along the depth axis for a relief-type real three-dimensional model increases the likelihood of obtaining a uniform exposure. As a photosensitive agent, silver halides such as silver bromide, silver chloride, or silver iodide can be used. These photosensitive agents are applied on the surface of the real three-dimensional model, dried, and then exposed.

Figure 13:
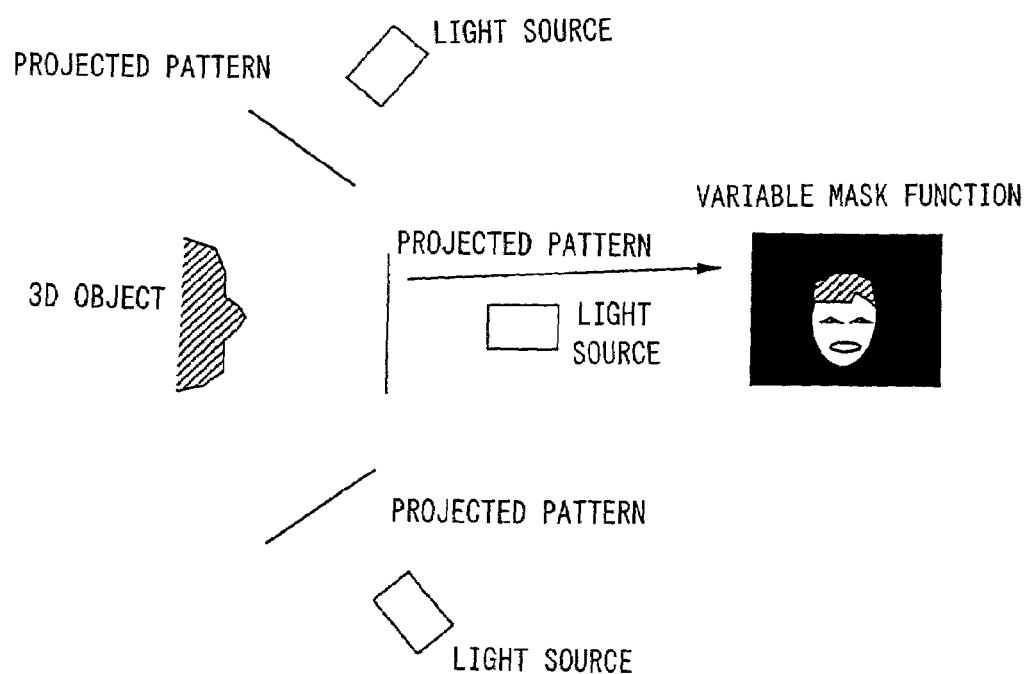
FIG. 13 is a diagram showing another exemplary structure for pattern projection.

Because the real three-dimensional model is a three-dimensional object, there are cases where sufficiently uniform exposure cannot be achieved depending on the direction of the surface. To this end, as shown in FIG. 13, it is preferable to provide a plurality of projection patterns corresponding to the directions of surfaces of the real three-dimensional model and to expose the photosensitive agent from a plurality of directions.

In this case, it is preferable to apply masks so that there will not be too much light incident on an overlapping section from a plurality of projection patterns. In this case, it is preferable to fix the positions of the light source and the projection patterns, and vary the masking based on the real three-dimensional model.

Figure 14:
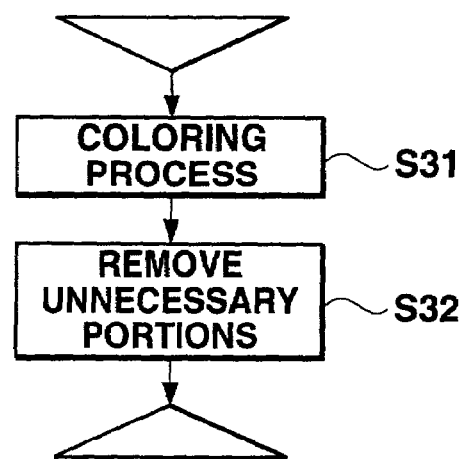
FIG. 14 is a flowchart for the coloring process by removing unnecessary parts.
Figure 15:
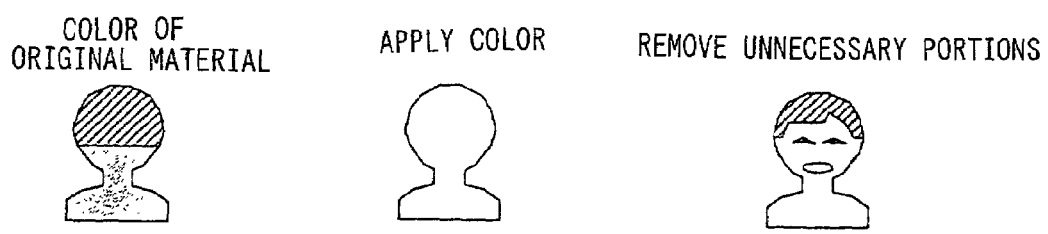
FIG. 15 is a diagram showing the coloring process by removing unnecessary parts.

Moreover, it is preferable to remove unnecessary portions after completing all the coloring processes. In other words, as shown in FIG. 14, the real three-dimensional model is colored (step S31), and then the unnecessary portions are removed by a drill or the like (step S32). In this manner, coloring of just the necessary portion can be achieved. For example, as shown in FIG. 15, in a human head, the material for the portion above the mouth can have a black color and the material for the portion below the mouth can have a red color. A skin colored paint is then applied to the entire head. By milling and removing the paints on the eyes, hair, and mouth, black eyes, black hair, and red lips can be formed.

Figure 16:
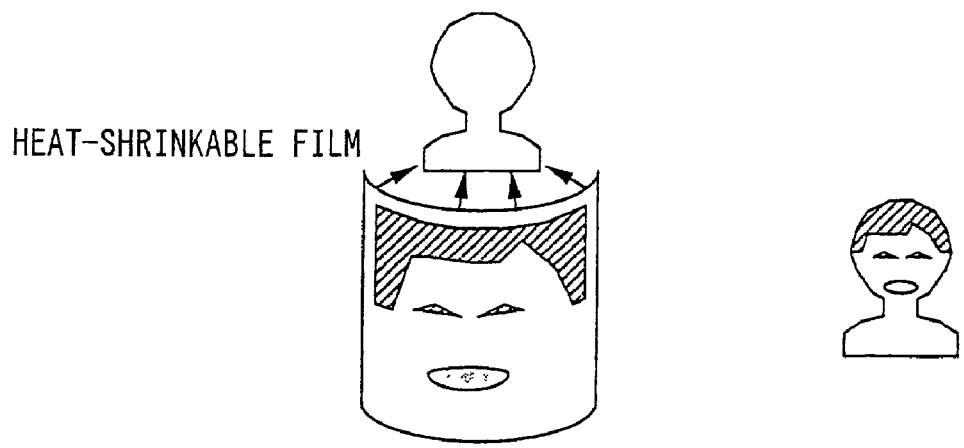
FIG. 16 is a diagram showing the coloring process using a heat-shrinkable film.

As shown in FIG. 16, it is also preferable to print a pattern on a heat-shrinkable film and to affix the film on the real three-dimensional model. In this case, a shrinking ratio must be calculated before printing, and the color must be thinned in portions with a high shrinking ratio. Accurate color after shrinkage can be obtained in this manner. Although when film is expanded, there are problems such as color division, shrinkage does not produce such a problem, and, therefore, thicker coloring is enabled.

As the heat-shrinkable film, it is preferable to apply a thin coat of a water soluble polymer such as PVA (polyvinyl alcohol) on a film of polyvinyl chloride or fluoride resin, to have a printing capability (print). It is also possible to use an expandable cloth instead of the film.

It is also possible to employ a coloring scheme as described in the following.

Figure 17:
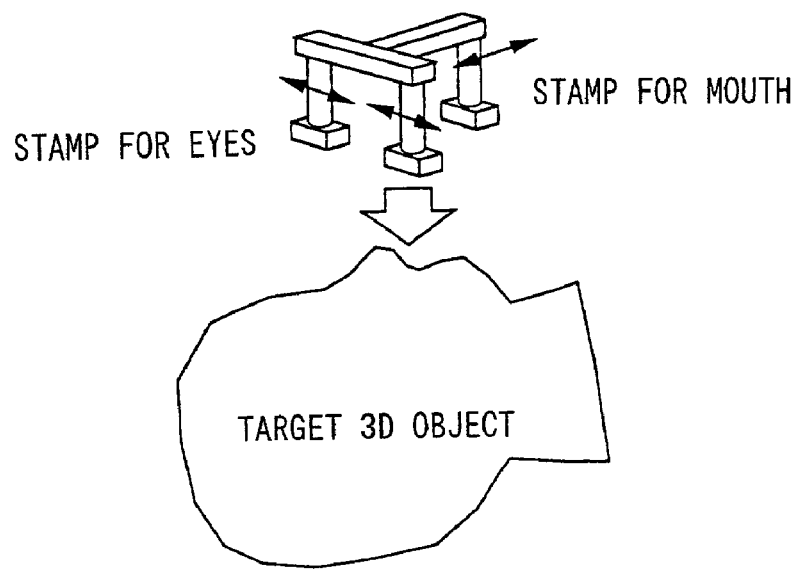
FIG. 17 is a diagram showing coloring process using a stamp.

For a human face, the main characteristic points lie in the eyes and mouth. Thus, it may be preferable to color only the eyes and mouth. In many cases, the positions of these items, rather than the shape, represent the characteristic point. Thus, as shown in FIG. 17, it is preferable to provide two stamps for eyes and one stamp for the mouth and color the real three-dimensional model by pressing these stamps against the surface. In this case, the stamps for the eyes are movable in the horizontal direction of the face and the stamp for the mouth is movable in the vertical direction of the face, allowing for adjustment of the stamps. By forming the stamp by a material which can be deformed, such as, for example, a sponge, the surface can easily be colored even when the surface is not completely flat. A sponge-like material is also preferable because it is easy to contain the coloring agent in the material.

It is also preferable to prepare a plurality of shapes for the eyes and mouth, select those most closely resembling the target, and use these to color the selected shape. It is also possible to drive a plurality of brushes for each color based on the data for the coloring process.

Figure 18:
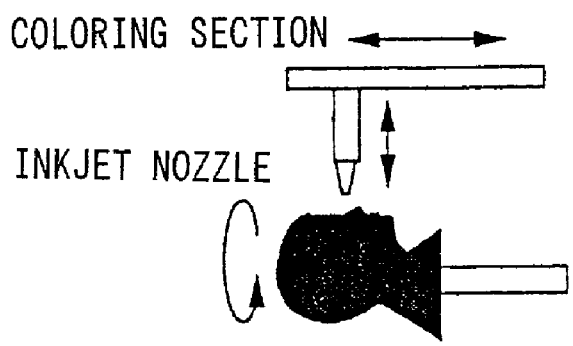
FIG. 18 is a diagram showing coloring process by three-axis driving an ink jet nozzle.
Figure 19:
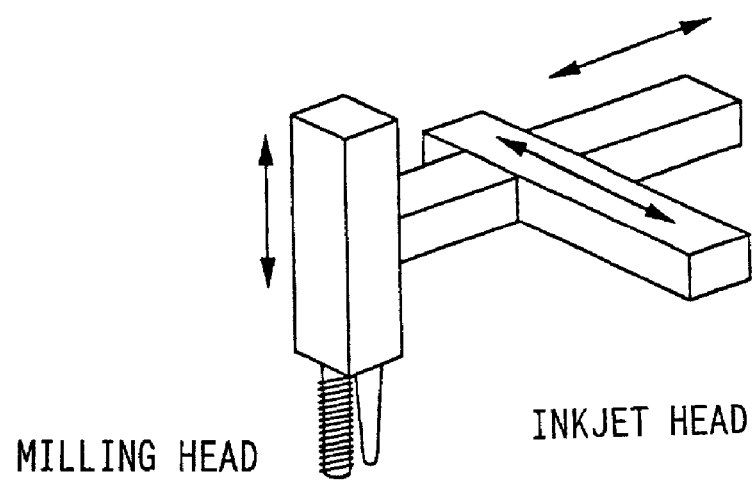
FIG. 19 is a diagram showing an example where an ink jet nozzle and a milling head are placed together.

As shown in FIG. 18, it is also preferable to drive an ink jet nozzle with three axes (rotation of the real three-dimensional model, and movement of the nozzle in the y and z directions). In this manner, a predetermined color can be applied to a predetermined location. As shown in FIG. 19, it is also possible to provide both an ink jet nozzle and a milling head with a forming drill on single component. By employing such a configuration, formation and coloring processes can be performed almost simultaneously, and there is a further advantage that only one control mechanism is required. When coloring process is performed after formation, the components can be driven based on the identical data for identical movement, and, thus, the coloring process can be efficiently performed.

It is also possible to color the real three-dimensional model by an impact dot method using a wire dot and an ink ribbon.

Moreover, it is also preferable, during the coloring procedure, to use a contact pin sensor to detect the surface position of the real three-dimensional model and to color based on the detected position. In this manner, a precise coloring process can be performed, even when the formation precision is insufficient.

It is also possible to transfer using a color processed film.

It is also preferable to layer and bond a plurality of pieces of paper based on the obtained three-dimensional shape data to form a three-dimensional object. In this case, the target shape is first divided by a plurality of parallel planes corresponding to each of the plurality of sheets of paper to be layered and bonded. For example, such a plane can be a plane perpendicular to the y axis (vertical axis) assigned to the three-dimensional shape data.

After printing the color on the cross section between each plane and the target shape on each piece of paper, the cross sections of these pieces of paper are cut, and the pieces are overlapped. A colored three-dimensional object can be formed in this manner.

"Variations"

It may also be preferable to display the three-dimensional shape, including the color, on a display when the three-dimensional shape data is obtained in order to allow a preview of the real three-dimensional model to be produced. When any number of processes described above are applied to compress, exaggerate the characteristic points, and/or limit the colors, it is preferable to show a display which is as close to the final product real three-dimensional model as possible.

It is also preferable to prepare various options and accessories that are different from the actual target, such as, for example, glasses and hair styles, and to permit the mounting of these options on the real three-dimensional model.

For a case of a person, the final real three-dimensional model can be either the head portion only or the complete person. For example, when a complete model is desired, because the face becomes too small, it is preferable to form the model by emphasizing the face by setting the face to body ratio to 1:1. It is also preferable to prepare few such variations, so that a customer is able to select one from among the prepared variations.

When a pet such as a dog is the target, it may be necessary to restrain the pet, such as by using a chain. When it is preferable to provide a chain at the capturing locations, by using the same color for the chain as the background color, extraction of the target from the captured data can be facilitated.

It is preferable to integrate the present invention as a single apparatus and place the integrated apparatus in an arcade or an amusement center. In this manner, a user can enter the apparatus and obtain an image data in the same fashion as taking a picture. After waiting a brief time, the user can obtain a real three-dimensional model doll at the takeout pocket section. A doll of the user can be produced in a similar manner as a picture or a sticker. It is also preferable, when some period of time is required before completion of the production, that a card is issued and the user be able to exchange the card for the produced doll. In this case, the doll for a user can be automatically discharged to the takeout section by reading the issued card by a card reader.

Figure 20:
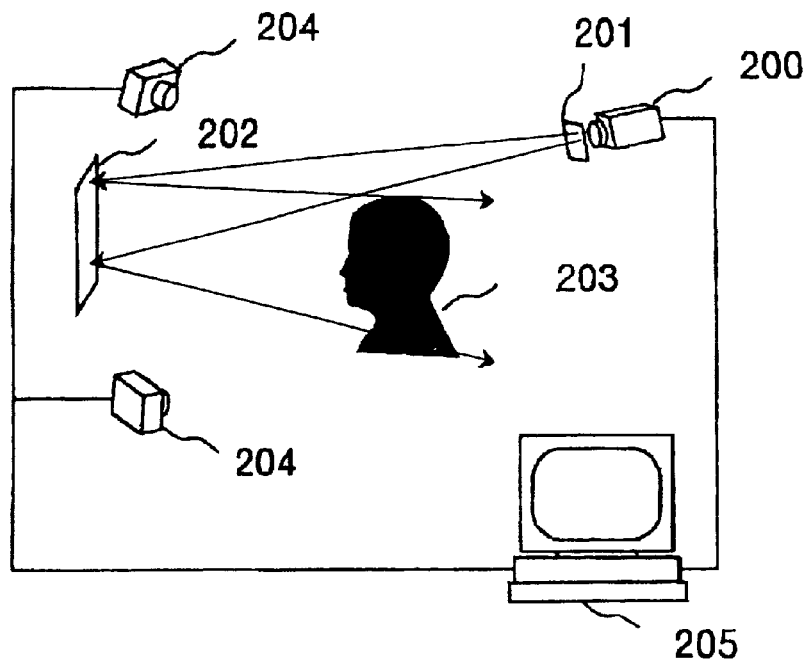
FIG. 20 is a diagram showing a structure of a three-dimensional data generating apparatus according to another embodiment of the present invention.

FIG. 20 is a diagram showing a structure of a three-dimensional data generating apparatus of another embodiment of the present invention.

A light projection section 200 projects a random pattern, slit pattern, or coded pattern assigned on a panel 201 onto a target which is a human face. The projected pattern light is reflected at a reflecting section 202 and projected onto the target 203.

An image of the target with the pattern light projected is then captured by an image inputting section 204 such as a CCD camera, and three-dimensional data of the target is produced at a modeling section 205 from the obtained plurality of images by any of the above described methods.

Figure 21A:
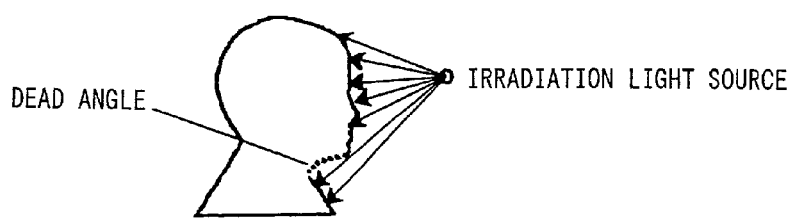
FIGS. 21(a) and 21(b) are diagrams for explaining the positioning of irradiation sources.

When the distance between the light source of the light projecting section 200 and the target is small and the pattern is directly projected on the target, the target itself produces a shadow, resulting in some portion of the target not projected with the pattern. In other words, there will be portions which cannot be seen from the light source (dead angle). In a case shown in FIG. 21(a), no pattern is projected onto a part of the neck, due to a shadow from the chin.

Thus, the shape measurement of these portions will be difficult or inaccurate.

Figure 21B:
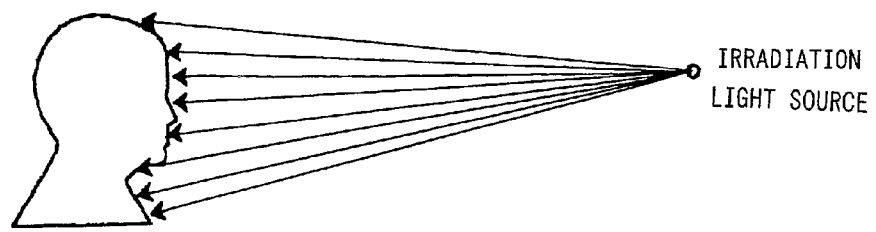

One solution for preventing such possibility of a dead angle is to set the distance between the light source and the target sufficiently large, as shown in FIG. 21(b). However, such a solution causes the size of the overall apparatus to become very large.

Thus, a reflecting section 202 is provided to reflect the projection pattern and project onto the target.

By employing such a method, the light path distance from the light projection section 200 to the target can be set at a large distance while the size of the overall apparatus is kept from becoming large.

It is also possible to irradiate a laser ray, other than the pattern light as described above, from the light projection section 200. A laser ray irradiating device generally has a structure such as shown in FIG. 22.

Figure 22A:
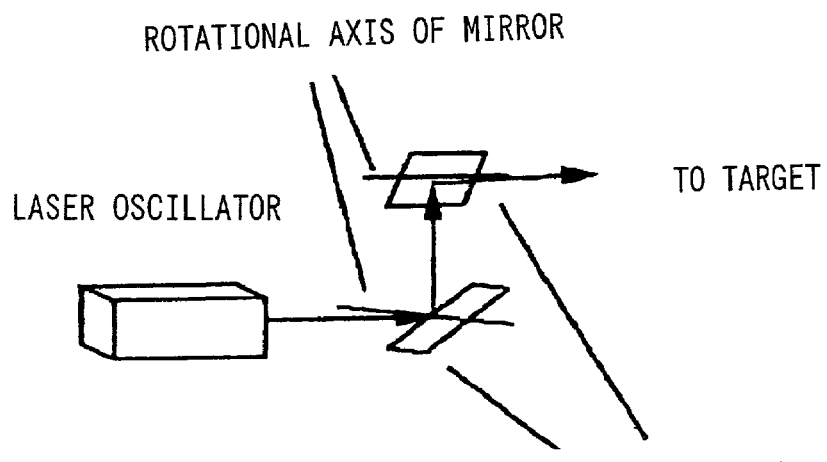
FIGS. 22(a) and 22(b) are diagrams for explaining a laser ray irradiating device.

Specifically, in FIG. 22(a), the direction of a beam-type laser ray is changed by a galvano mirror or a polygon mirror, in order to allow a two-dimensional scan.

Figure 22B:
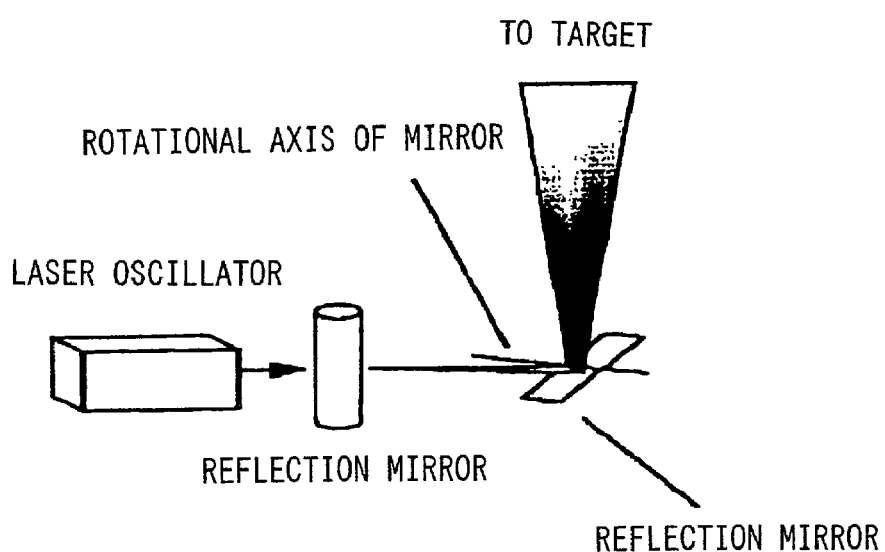

In FIG. 22(b), a beam-type laser ray is once changed into a slit light at a cylindrical lens and then the direction of the laser ray is changed by a galvano mirror or a polygon mirror, in order to allow a two-dimensional scan.

However, even in these cases, when the distance to the target is insufficient, there will be problems associated with the produced dead angle. Therefore, setting the light path distance large using a reflecting section is again an effective method for reducing the dead angle.

Figure 23A:
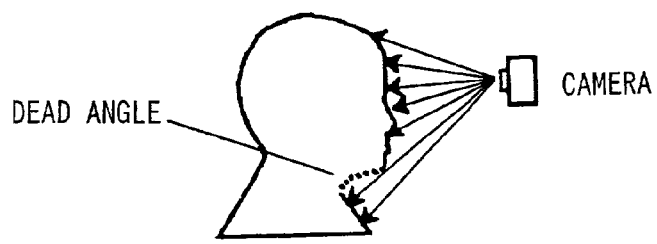
FIGS. 23(a) and 23(b) are diagrams for explaining the positioning of irradiation sources.
Figure 23B:
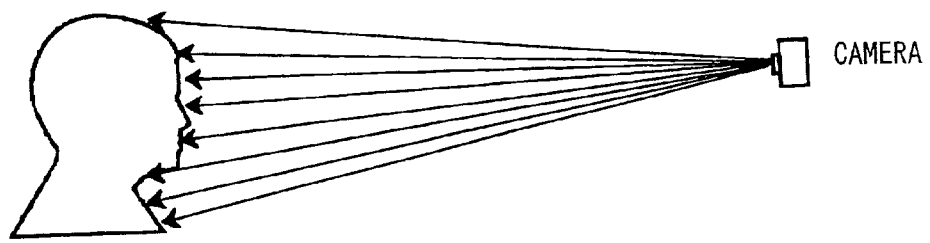

The problem of dead angle, on the other hand, is similarly generated when an object on which the pattern is projected is input. For example, as shown in FIG. 23(a), when an image of an object on which a pattern is projected is to be captured using a CCD camera, the neck portion which is covered by a shadow of the chin cannot be input due to the reason described above. In such a case, as shown in FIG. 23(b), the solution is to set the distance between the camera and the target sufficiently large, using a lens with a longer focal distance. However, similar to the above, there remains a problem that the overall size of the apparatus becomes very large.

Thus, the camera captures an image of the pattern projected target as reflected at the reflecting section. In this manner, the distance from the target to the camera can be set at a large distance thereby reducing the dead angles, while simultaneously the size of the overall apparatus is kept small.

Figure 24:
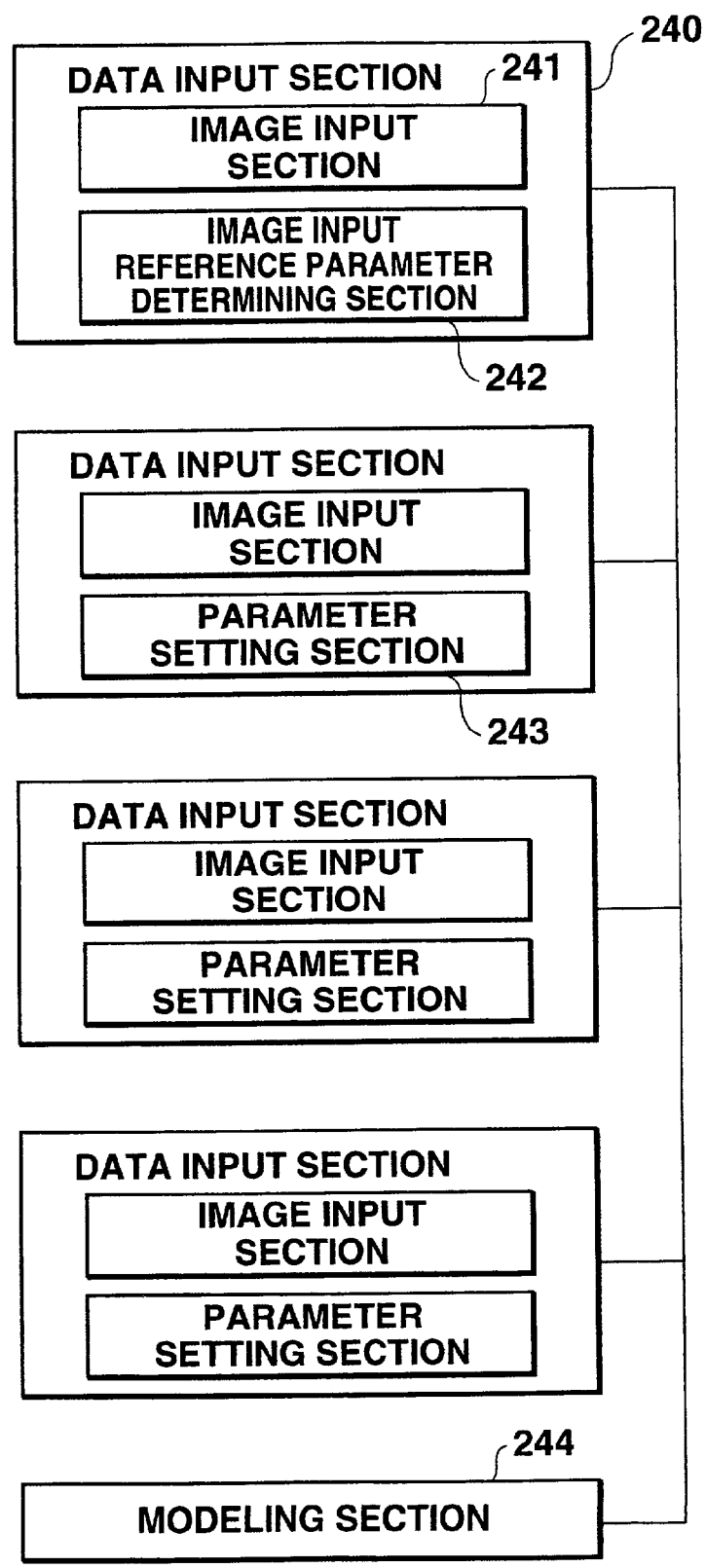
FIG. 24 is a diagram showing a structure of a three-dimensional data generating apparatus according to yet another embodiment of the present invention.

FIG. 24 is a diagram showing a structure of a three-dimensional data generating apparatus according to another embodiment of the present invention.

A plurality of data inputting sections 240 for capturing a target from a plurality of directions and inputting the image data are included. The data inputting sections 240 include an image inputting section 241. As the image inputting section 241, an analog or digital color CCD camera or the like can be used.

Some of the data inputting sections have a data input reference parameter determining section 242 for determining suitable values for the parameters such as white balance and exposure during the data input process.

The other data inputting sections, on the other hand, include a parameter setting section 243 for setting the parameters to those determined at the data input reference parameter determining section 242. At these data inputting sections, image input is performed based on the set parameter.

At the modeling section 244, three-dimensional shape data of the target is calculated based on a plurality of images obtained at the data inputting sections. The modeling process can be, for example, the method disclosed in Japanese Patent Laid-Open Publication No. Hei 10-124704.

Figure 25:
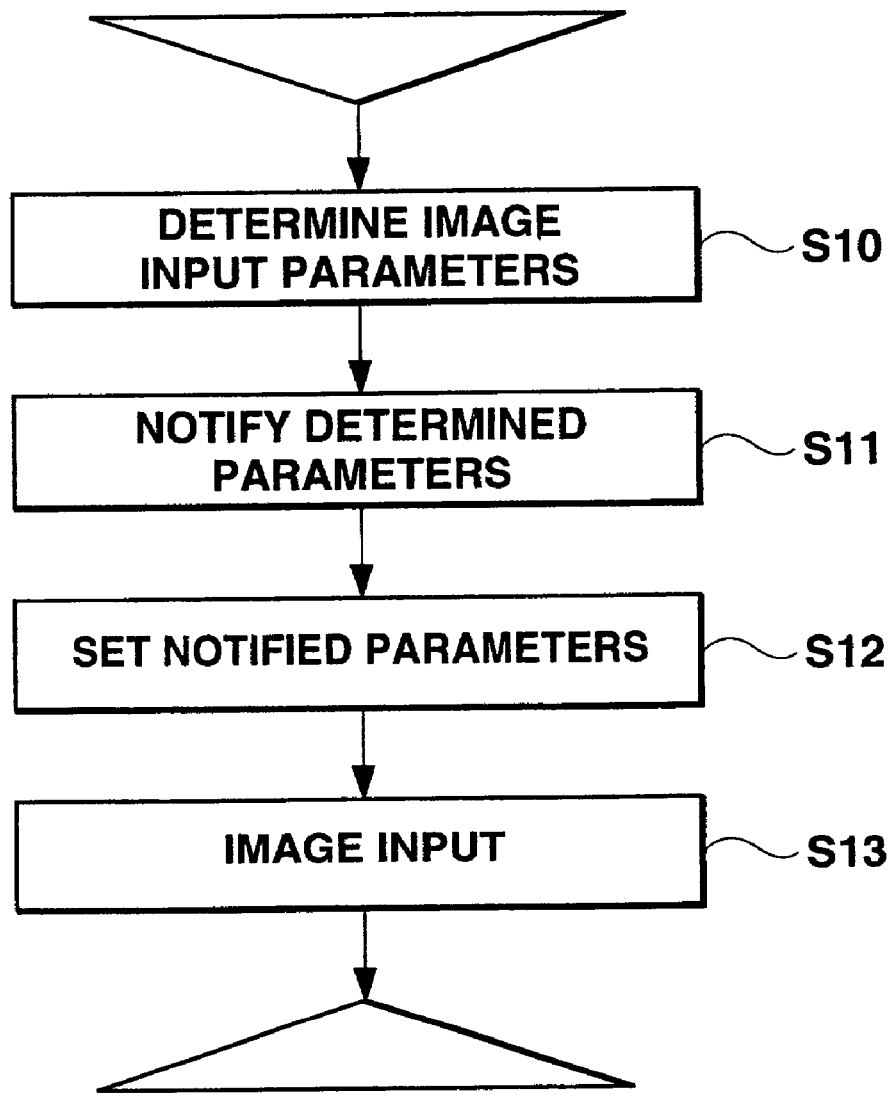
FIG. 25 is a diagram showing the flow of data input.

The data input flow will next be described referring to FIG. 25.

Parameters such as white balance and exposure are automatically determined at a data inputting section (step S10). This can be easily accomplished by automatic white balance and/or automatic exposure functions provided on a common camera.

The determined parameters are then notified to the other data inputting sections (step S11).

At each of the data inputting sections, the notified parameters are set at the parameter setting section within each of the data inputting sections (step S12). In other words, at these data inputting sections, the parameters are not automatically determined at the respective inputting sections, but, rather, the parameters are set as notified from outside.

An image is then input at all of the data inputting sections based on the set parameter (step S13).

In this manner, by using the parameter determined at one data inputting section as a common parameter, and inputting the image at all the data inputting sections based on the common parameter, images of uniform quality can be obtained.

If, on the other hand, the parameters are individually set at each of the data inputting section to suit the individual views, different parameters will be set as the suitable parameter because (a) the portion of the target which can be seen from the inputting sections are different and (b) the background (portion other than the target) which can be seen from the inputting sections are different.

Because of this, colors for the same element, which should, of course, be identical, actually differ for each of the data input sections, leading to a problem when one unified three-dimensional shape data is generated. However, by determining a reference parameter and using the reference parameter as a common parameter, image input is enabled which satisfies the condition that the color for the same element should be identical.

Here, a case is shown where the reference parameter is automatically determined at one data inputting section, but the reference parameter can also be determined by an operator. There are some cases where an experienced operator wishes to set a suitable parameter value different from the value automatically determined by the data inputting section, based on his experience or when he wishes to have a special effect. In such a case, it is preferable to manually set the reference parameters.

Although in the above example three-dimensional shape data of the target is created, the method can also be applied where it is desired to create pseudo-three-dimensional data, such as QuickTime VR data, of the target. By using the method of the present invention, the problem of colors changing when the target is rotated and displayed can be avoided.

When a real three-dimensional model is created by inputting a person's face or body and forming a model for providing to a customer as described above, a certain amount of time is required between the inputting process and completion of the model formation. When such a three-dimensional modeling apparatus is to be placed in, for example, an arcade, it may be preferable to employ the following embodiment. The description will be for a case where a human face is input.

Figure 26:
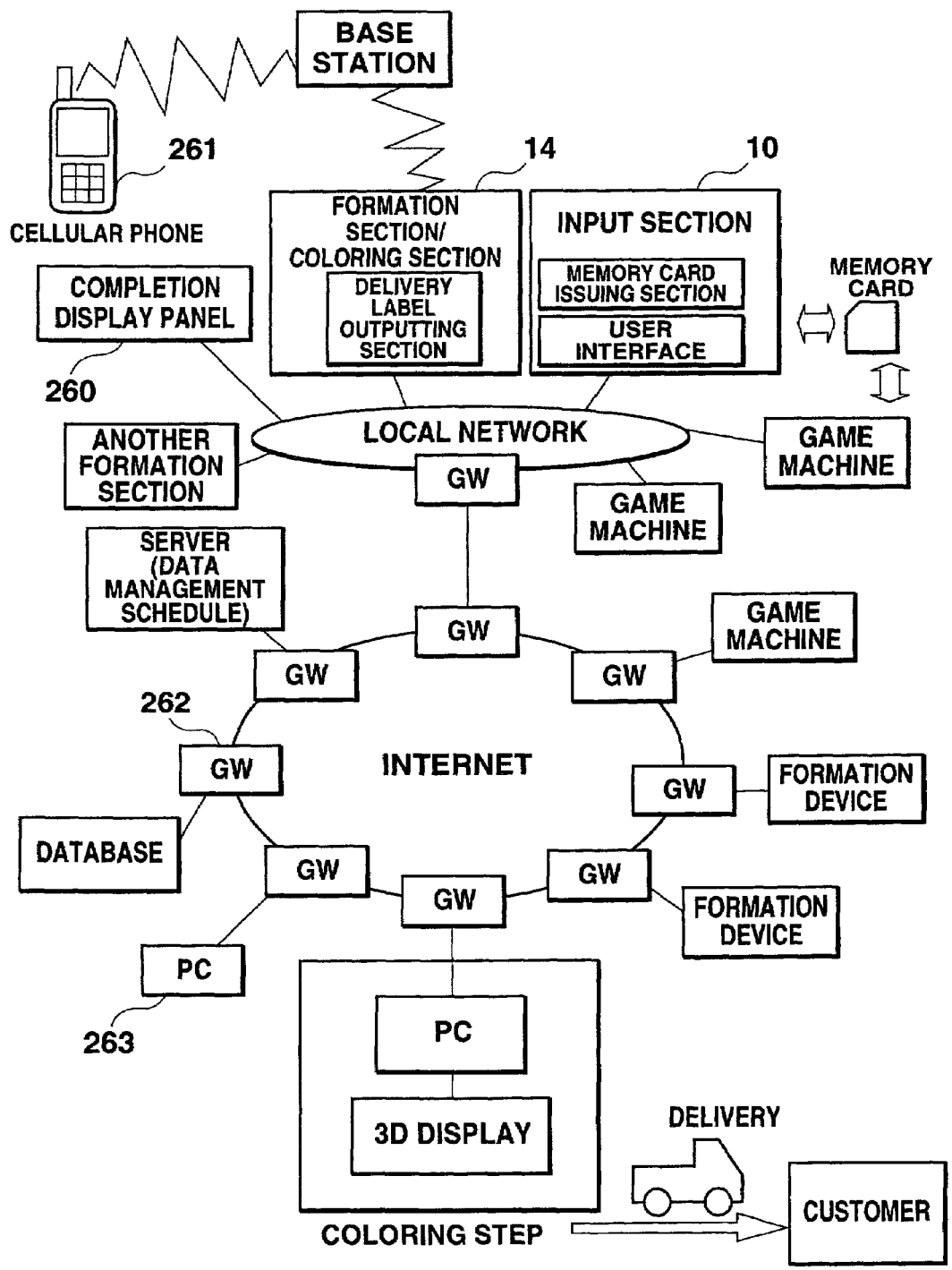
FIG. 26 is a diagram showing an exemplary structure of a three-dimensional modeling apparatus according to still another embodiment of the present invention.

The three-dimensional modeling apparatus comprises an inputting section for inputting data and a forming section. These sections can be integrated together, or, alternatively, can be connected by a network as shown in FIG. 26. The inputting section includes a memory card issuing section, and the three-dimensional modeling apparatus issues a memory card when a customer inputs his face data. The memory card stores information such as the identification number of the three-dimensional shape data of the input face and the actual three-dimensional shape data.

While the customer waits for the completion of the model, they are enticed to use other game machines. It is preferable to allow the customer to use the issued memory card by letting the other machine read the contents of the memory card and using the recorded three-dimensional shape data for display or for replacing a character within the game. While conventional game machines only allow for input of the name when a new point record is made, with the present apparatus, it is possible and preferable to display the three-dimensional shape data stored in the memory card along with the point record. In this manner, a customer can enjoy their waiting time and the likelihood of customer dissatisfaction is reduced.

It is also preferable to allow for additional recording on the memory card for the game points at the other game machines. By determining size, coloring parameters, or number of products of the real three-dimensional model to be formed based on the recorded points, it is possible to encourage the customer to use more game machines.

In this case, the formation process must be started by a start command such as the customer inserting the memory card into the forming device.

Moreover, when the game machines within an arcade are interconnected by a network, it is preferable to store only the identification number in the memory card and to distribute the three-dimensional shape data to each of the game machines via the network. Alternatively, it is possible to issue an identification number of a customer when he inputs the face data, and let the customer input the identification number at each game machine so that there is no need for a memory card. Specifically, the identification number can be an electrical mail address or a phone number for a portable phone, both of which may be input by the customer, or the total sequence number of the customer counted from the start of the business.

It is also important to notify the customer when the actual formation process has been completed. When the game machines within an arcade are connected via a network, it is preferable to display a message notifying the customer of the completion of the model formation on a game machine that the customer is using at that time. In consideration of a case where the customer is not using a game machine, it is also preferable to separately provide a display panel (completion display panel 260) within the arcade for displaying the identification number for models that have been completed.

In addition to the above, it is preferable that the phone number for a portable phone belonging to the person requesting the model be input along with the face data, and to set the apparatus so that it notifies the customer by calling their portable phone when the formation is complete. It is possible to notify the completion by sending an electrical mail to a portable phone 261 or a portable terminal with an electrical mail capability.

In addition, it is also preferable to display, when inputting the face data, the earliest time when the real three-dimensional model formation can be completed, to allow the customer to specify a desired time after the earliest time, and to start the formation of the model to follow the specified schedule. In this manner, the customer can predict when the real three-dimensional model will be available and can obtain the model at the desired time.

When game points earned at other game machines affect the resulting real three-dimensional model as described above, it is preferable to set the apparatus so that the formation starting time is pre-specified when the face data is input and that the points obtained prior to the starting time affect the resulting real three-dimensional model.

For a customer who wishes to obtain three-dimensional shape data but does not require a real three-dimensional model, it is also preferable that the three-dimensional shape data be sent via electronic mail after the face data is input. Alternatively, it is also preferable that the three-dimensional shape data be saved on a server and that an electronic mail be sent to provide identification information for accessing the server. In the latter case, the customer accesses the server by ftp or via the web when the data becomes necessary, inputs the sent identification number, and downloads the desired data.

It is also preferable that a delivery destination address be input along with the face data, and, when the real three-dimensional model is formed, to print and output the address for directly delivering the real three-dimensional model. After the forming process, the created real three-dimensional model can be packed, the printed and output delivery destination label can be affixed on the package, and the package can be transferred to a suitable delivery agent, allowing for a very easy delivery procedure. When a plurality of forming sections are present in a wide area through a network, it may be preferable to transmit the three-dimensional shape data to a forming device that is logistically convenient or geographically close based on the delivery destination address, to form the model at the selected forming device, and to deliver the model to the specified delivery destination. By employing such a method, the time and cost for delivery of the real three-dimensional model to the customer can both be reduced.

When the real three-dimensional model is formed, rather than forming only the face which has been input, by forming a plurality of faces or by forming a face with other accessories, an added-value can be obtained. For this purpose, the three-dimensional modeling apparatus is connected to a database via a network. In the database, pre-stored three-dimensional shape data for celebrities, CG synthesized three-dimensional shape data for animation heroes, or three-dimensional shape data of friends of the customer, and the three-dimensional shape data for accessories such as glasses and earrings are stored and managed.

The three-dimensional modeling apparatus further comprises a user interface section. The customer can view various data registered in the database and specify desired data via the user interface section. The specified data is integrated with the three-dimensional shape data of the customer himself, and the generation of the real three-dimensional model is performed at the forming section. With the above procedure, it is possible for the customer to obtain a virtual real three-dimensional model such as, for example, a model in which the customer and a celebrity are together. It is also possible to generate a virtual real three-dimensional model where the model wears ornaments that the customer does not actually wear.

Many of such three-dimensional modeling apparatuses comprise a plurality of forming devices rather than only one forming device. The plurality of forming devices can either have identical specifications or different specifications. As different specification, various cases can be considered, such as, for example, different size of three-dimensional models that can be formed, different materials for the forming object, or different method of forming, such as, for example one unit employing a milling method and one based on 3D lithography type, for example).

When a plurality of forming devices are connected, it is preferable to schedule these apparatuses. Specifically, a scheduling section comprises a calculator such as a computer, and manages the processing progress at each of the connected forming devices and information on the data which is waiting to be processed. Also, each of the forming devices may store information on the average completion time for formation for each set of three-dimensional shape data.

The three-dimensional shape data, after the modeling process at the modeling section, is sent to the scheduling section. Based on the operational conditions of each of the forming devices, the data is transmitted to a suitable forming device. Here, a suitable device would normally be the forming device with the shortest wait time for the process. It is possible for a customer to specify parameters for formation such as the formation size or the like at the user interface section. In this case, the scheduling section may, instead of strictly selecting the device with the shortest wait time, may select a device with the shortest wait time from among devices that satisfy the user specified parameters.

It may not in all instances be desired that the data input and the formation start be close. For example, in an application for preparing a statue of deceased for funeral use, it is preferable that the data be input while the customer is still alive and then be stored in a server. A formation request will be made when the statue is needed, and the formation will then be started at that point.

Thus, in this case, a plurality of data, in actuality, an enormous amount of data, must be stored in the server. It is possible to send the formation request electronically, such as via an electronic mail, and the forming section also accepts the delivery destination for delivering the product, in addition to the formation request.

An apparatus for supplying a real three-dimensional model to a customer by automatically performing processes from three-dimensional input till the formation has been described. Next, a method for supplying a real three-dimensional model to a customer after coloring the formed real three-dimensional model will be described.

The coloring process may be performed automatically as described before. Here, however, an example will be described wherein the coloring process is manually performed in order to allow for more flexible coloring to satisfy the customer's wishes. An example of this case includes a memorial doll production for family events such as a wedding or a funeral. Specifically, the case includes production of "May Dolls" resembling a child, production of dolls of a bride and groom for a wedding, and production of a doll of the deceased to be displayed at a funeral.

The uncolored real three-dimensional model, created by the real three-dimensional modeling apparatus as described above, is sent for coloring process, which may be performed manually by a coloring craftsman. The coloring craftsmen color the real three-dimensional model, and the colored real three-dimensional model will be delivered to the customer.

In order to efficiently complete such coloring procedure by coloring craftsmen, it is preferable to perform the coloring operation while viewing the three-dimensional data from an specified angle. For this purpose, in the coloring step, the three-dimensional shape data is sent along with the real three-dimensional model to be colored. This further requires a display apparatus for displaying the object from an arbitrary view point based on the sent three-dimensional shape data.

The display apparatus corresponds to, for example, a display of a personal computer. The personal computer temporarily stores the received three-dimensional shape data, generates an image from an arbitrary point of view based on this data and according to a direction given by the coloring craftsman, and displays an image on the display. Preferably, the display is one capable of a three-dimensional display including stereo-scopic display. Specifically, examples of the display apparatus includes a three-dimensional display using a liquid crystal shutter or changing glasses and a three-dimensional display of no-glass type with a lenticular lens or a parallax barrier.

It is desirable that the real three-dimensional model is directly delivered to the customer after the coloring procedure is completed. For this purpose, it is possible for a customer to input a desired delivery destination via the user interface included in the inputting section. The delivery destination is printed on a label and sent to the coloring craftsman along with the real three-dimensional model to be colored. The data can also be sent to the coloring craftsman via a network and can be printed on the label by the coloring craftsman.

It is also preferable that a plurality of coloring craftsmen exist with their schedules managed as described before.

When such a real three-dimensional model is generated, it is also possible to use a component formed based on the individual input data only for the head portion, and to combine the created head component with a pre-formed body component. In general, a characteristic of a person appears mostly in the head (face) portion. Therefore, by using a common component for the less-distinctive body section, production costs can be reduced. For example, the pre-provided component can be a body section of a commercially available doll. In such a case, it is preferable to provide a component, referred to as a neck component, for incorporating the head component with the following characteristics for incorporating an individually prepared head component to a body component.

1. The neck component has a shape such that it can be affixed to the doll body component.
2. The neck component has a shape that allows attachment to the doll head component.
3. The neck component is rotatable after attachment to the doll head component.
4. The neck component is made of the same material as the doll head component.

Figure 27:
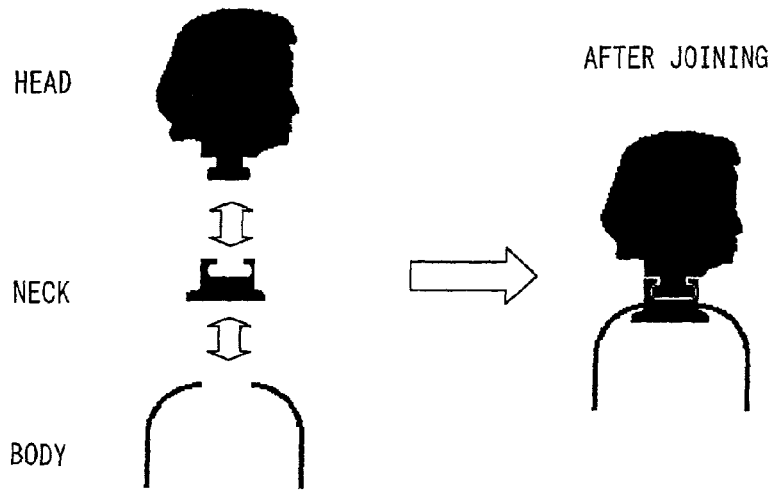
FIG. 27 is a diagram showing a method for incorporating the real three-dimensional model.

In other words, as shown in FIG. 27, a doll is created by connecting the doll head component, neck component, and body component. As with a common doll, the head portion is rotatable with respect to the neck. Moreover, although a doll is usually outfitted with clothing, at least a portion of the neck is exposed, as is the head portion. Therefore, it will be conspicuous if the materials for the head and the neck are different, and thus, it is desirable that the materials be identical.

In addition to the above, it is also preferable to provide the three-dimensional shape data itself without creating a real object model based on the input three-dimensional shape data. Specific examples of this application include a dating agency and three-dimensional goods catalog for the Internet.

When providing data in a field such as a dating agency, it is preferable that a restriction be applied for data access and for display point of view. In other words, only the registered members are allowed to access the data and only a display from a display view point that is permitted by the person who provided the three-dimensional shape data is allowed. The restriction is particularly important for the latter case, because in general, there is a view point that a person do not wish others to see from (such as, for example, view point at the bottom viewing toward top).

It is also preferable to distinguish the guest users and the registered members on the range of allowed view points that can be chosen. In this manner, incentive to join the members can be increased.

It is also preferable for a plurality of data for various facial expressions to be input when inputting the data for one person, and to sequentially display three-dimensional shape data with a plurality of facial expressions according to a request from a viewer. Particularly, by using common data for the body portion of a person and displaying the plurality of face expressions by only replacing the head portion, three-dimensional display of a plurality of facial expression data for the person can be preformed quickly.

In addition to the above, it is also preferable that voice data be along with the three-dimensional shape data. By combining the voice with the three-dimensional shape data, the data can be displayed with the voice. With current computer graphics technology, it is possible to alter the three-dimensional shape data of a face to move the mouth to correspond to the voice to create an appearance that the three-dimensional display is speaking, and such a display is also preferable.

Compared to the total volume of all three-dimensional shape data used by, for example, a dating agency, in the application for a three-dimensional product catalog on the Internet, an enormous a amount of data must be managed. Therefore, there is a need to select a certain items from the enormous amount of data for display to a customer. For this purpose, the it is preferable that the three-dimensional modeling apparatus access a database system.

Figure 28:
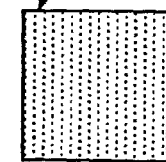
FIG. 28 is a diagram showing an example of the contents of the database.
Figure 28:
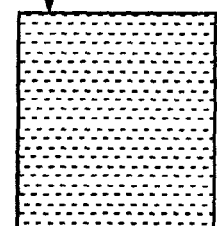

As shown in FIG. 28, property information is stored in the database along with the input three-dimensional shape data. The property information varies according to the application. For a dating agency, the property information correspond to information such as taste, hobby, background, and body size including height and weight. In a case for three-dimensional product catalog on the Internet, the property information correspond to the size of the items, color information, specification, and price. The size information can also be easily and automatically calculated from the obtained three-dimensional shape data, and thus, it is possible to register the automatically extracted information as the property information.

It is preferable that, in addition to the three-dimensional shape data itself, a thumbnail image of the data also be managed by the database. This is preferable because there is a demand for a customer to view the general image of an item by a thumbnail image after the customer has narrowed down from the items registered in the database based on specific keywords. Examples of methods for generating a thumbnail image include:

1. generating an image from a specific point of view according to the three-dimensional shape data and using the image as the thumbnail image;
2. generating a plurality of images from a plurality of points of view according to the three-dimensional shape data, integrating the plurality of images into a series of animation, and obtaining an animated thumbnail image;
3. reducing a two-dimensional image used during the three-dimensional shape data input and using the image as the thumbnail image; and
4. generating a reduced thee-dimensional shape data by further reducing data from the original three-dimensional shape data and using the image as the thumbnail image.

When undetermined access to the data via a network is made possible, it may be preferable to employ a system where the number of accesses to each data is recorded and charges are determined based on the recorded data. The database has information on the charge/refund subject related to each data. The number of accesses for the data are collected every month and charge/refund processes are executed for the charge/refund subject according to the number of accesses. In a case of a product catalog, a method can be considered where a greater charge is associated with items with more accesses, because the number of accesses indicate that significant advertising effect was presented. On the other hand, there is another system where a predetermined amount of money is paid to the supplier of the data system when registering to the database, and wherein this amount increases the amount of refund with an increase in the number of accesses. The latter case is based on a concept that data which utilizes the storing space, but is not accessed should be penalized. In some cases, the refund may be considered as a bounty.

In the above, various examples are described. In any of the cases for supplying the three-dimensional shape data, usage of a three-dimensional display apparatus as the display side is preferable. A three-dimensional display apparatus is one of the most suited apparatus for displaying three-dimensional shape data. It is effective to input voice with the three-dimensional shape data and to input three-dimensional movement information along with the shape information. Because human body movements are produced at the joints, it is possible to divide the input three-dimensional shape data into parts at the joint sections. By recording the relative movement information for each of the parts, movement information can effectively be recorded. When preparing a three-dimensional image for the customer, the three-dimensional image can be shown efficiently by displaying the motion of the three-dimensional shape data so that the display moves part-by-part based on the input movement data.

As described above, according to the present invention, a practical system for effectively and efficiently providing automatically generated real three-dimensional model and three-dimensional shape data to a customer can be realized.

What is claimed is:

1. A three-dimensional modeling apparatus for supplying a three-dimensional model of a target to a customer, comprising:
   an input section for inputting three-dimensional shape data of said target;
   a formation section for manufacturing a real three-dimensional model based on the obtained three-dimensional shape data; and
   a recording medium issuing section for issuing a recording medium in which information can be written to or read from, when said three-dimensional shape data is input, wherein
   said recording medium can be read by a third-party apparatus.

2. A three-dimensional modeling apparatus of claim 1, wherein said recording medium is capable of recording data identification information.

3. A three-dimensional modeling apparatus of claim 1, wherein said recording medium allows new information to be written by a third-party apparatus.

4. A three-dimensional modeling apparatus of claim 3, wherein said third-party apparatus is an entertainment device and said new information is a score of the entertainment provided by said entertainment device, said score being evaluated by the entertainment device.

5. A three-dimensional modeling apparatus of claim 4, further comprising a recording medium information re-input section for re-reading said new information from said recording medium, said new information having been written by said third-party apparatus.

6. A three-dimensional modeling apparatus of claim 5, wherein the formation parameters are changed based on the information input from said recording medium information re-input section and a real object model is formed from the changed formation parameters.

7. A three-dimensional modeling apparatus of claim 1, wherein three-dimensional shape data which is input by said input section is recorded on said recording medium.

8. A three-dimensional modeling apparatus of claim 7, wherein said third-party apparatus is an entertainment device which reads the three-dimensional shape data recorded on said recording medium and executes an entertainment program of said entertainment device.

9. A three-dimensional modeling apparatus of any one claim 1, further comprising:
   a motion input section for inputting motion information of said three-dimensional shape data input from said input section;
   a dividing section for dividing said three-dimensional shape data input from said input section into a plurality of portions; and
   a motion recording section for linking and recording said motion information and said plurality of divided portions.

10. A three-dimensional modeling apparatus for supplying a three-dimensional model of a target to a customer, comprising:
    an input section for inputting three-dimensional shape data of said target;
    a formation section for manufacturing a real three-dimensional model based on the obtained three-dimensional shape data;
    a communication section which can communicate with a third-party apparatus via a network; and
    a formation process progress information transmitting section for transmitting the progress information of the formation process at said formation section to said third-party apparatus.

11. A three-dimensional modeling apparatus of claim 10, wherein said formation process progress information of said formation section includes formation completion time information and said time information is displayed at a display section provided on said third-party apparatus.

12. A three-dimensional modeling apparatus of claim 10, wherein said communication section receives the information at said apparatus and changes parameters for forming the real three-dimensional model based on said information, and said formation section forms the real three-dimensional model based on the changed parameters.

13. A three-dimensional modeling apparatus of claim 10, wherein said three-dimensional shape data is transmitted to said third-Party apparatus via said communication section.

14. A three-dimensional modeling apparatus of claim 13, wherein said third-party apparatus is an entertainment device and said transmitted three-dimensional model shape data is used by said entertainment device.

15. A three-dimensional modeling apparatus for supplying a three-dimensional model of a target to a customer, comprising:
    an input section for inputting three-dimensional shape data of said target;
    a formation section for manufacturing a real three-dimensional model based on the obtained three-dimensional shape data;
    a contacting means input section for inputting information specifying a contacting means used by said customer; and
    an information notifying section for notifying modeling information to said contacting means.

16. A three-dimensional modeling apparatus of claim 15, wherein said contacting means for the customer is a cellular phone, the phone number for said cellular phone is input at said contacting means input section, and said modeling information is progress information of a manufacturing process at said formation section.

17. A three-dimensional modeling apparatus of claim 15, wherein said contacting means for the customer is an electronic mail, the mail address for the electronic mail is input at said contacting means input section, and said modeling information is manufacturing completion information.

18. A three-dimensional modeling apparatus of claim 17, wherein said modeling information is identification information for accessing a server which stores the three-dimensional shape data, in addition to being said manufacturing completion information.

19. A three-dimensional modeling apparatus of claim 17, wherein said modeling information is three-dimensional shape data.

20. A three-dimensional modeling apparatus of claim 14, further comprising:
   an estimated completion time display section for displaying the shortest estimated time for the manufacturing completion; and
   a manufacturing completion time specifying section for specifying a time after the shortest manufacturing completion time, wherein
   a schedule for the manufacturing process is determined to accommodate the completion time indicated at said manufacturing completion time specifying section by said customer.

21. A three-dimensional modeling apparatus of claim 20, further comprising a process start receiving section for receiving start time for the manufacturing process, wherein the manufacturing process is started according to the start time indicated by said customer.

22. A three-dimensional modeling apparatus of claim 15, further comprising:
   an address means input section for inputting delivery destination address for said real three-dimensional model; and
   a delivery destination printing section for printing said delivery destination address.

23. A three-dimensional modeling apparatus of claim 15, further comprising a formation section selecting section, connected to a plurality of formation sections via a network, for selecting a suitable formation section based on said input address, wherein the three-dimensional shape data is transmitted to said selected formation section.

24. A three-dimensional modeling apparatus of claim 15, further comprising a communication section which can communicate with a database section for storing the three-dimensional shape data via a network, wherein said three-dimensional shape data is recorded at said database section.

25. A three-dimensional modeling apparatus of claim 24, further comprising a three-dimensional shape data synthesizing section for reading three-dimensional shape data pre-stored in said database section and generating new three-dimensional shape data obtained by integrating a plurality of three-dimensional shape data.

26. A three-dimensional modeling apparatus of claim 15 further comprising:
   a plurality of formation sections, and
   a server section for managing the three-dimensional shape data input from said input section, wherein
   a formation section of the plurality of formation sections is selected at said server section for assigning said three-dimensional shape data input from said input section.

27. A three-dimensional modeling apparatus of claim 26, wherein the selection of said formation section is performed based on the operation conditions at said plurality of formation sections.

28. A three-dimensional modeling apparatus of claim 26, further comprising a parameter specifying section for the customer to specify the material or size of the object to be formed, wherein the selection of said formation section is performed based on the parameters specified at said parameter specifying section.

29. A three-dimensional modeling apparatus of claim 26, wherein at least two of said input section, formation section, and server section are connected via a network.

30. A three-dimensional modeling apparatus of claim 26, further comprising a display section for displaying an image of said three-dimensional shape data seen from an arbitrary point of view.

31. A three-dimensional modeling apparatus of claim 30, wherein said display section is a display device capable of three-dimensional display including stereo-scopic display.

32. A three-dimensional modeling apparatus of claim 26, further comprising a coloring section for coloring the real three-dimensional model based on said three-dimensional shape data.

33. A three-dimensional modeling apparatus for supplying a three-dimensional model of a target to a customer, comprising:
   a data input section for inputting three-dimensional shape data of said target; and
   a formation section for manufacturing a real three-dimensional model based on the obtained three-dimensional shape data; wherein
   said real three-dimensional model comprises a plurality of parts, and a portion of the parts is selected from a database containing a list of a plurality of pre-provided components based on the measured three-dimensional shape data of said target.

34. A three-dimensional modeling apparatus of claim 33, wherein said selected component is further processed.

35. A three-dimensional modeling apparatus of claim 34, wherein
   said real three-dimensional model is manufactured from at least three parts,
   the first and second parts are manufactured from an identical first material,
   the third part is manufactured from a material different from said first material,
   three-dimensional shape data which correspond to at least said first part is input at said input section,
   the first part is manufactured at said formation section based on said input three-dimensional shape data, and
   said manufactured first and second parts and second and third parts are respectively integrated by joining respective parts together.

36. A three-dimensional modeling apparatus for supplying a three-dimensional model of a target to a customer, comprising:
   an input section for inputting three-dimensional shape data of said target;
   a recording section for recording a plurality of three-dimensional shape data which are input from said input section;
   an identification number input section for inputting an identification number which is used for determining whether to display said recorded three-dimensional shape data;
   an identification number judging section for judging whether to display said recorded three-dimensional shape data based on said input identification number; and
   a data outputting section for displaying said recorded three-dimensional shape data, wherein the recorded three-dimensional shape data can be displayed from a plurality of predetermined points of view within a predetermined range, one of the plurality of predetermined points of view is selected based on said identification number, and the recorded three-dimensional shape data is displayed based on the selected point of view.

37. A three-dimensional modeling apparatus of claim 36, further comprising a modifying section for reading and modifying said three-dimensional shape data recorded at said recording section, and for recording the modified data to said recording section.

38. A three-dimensional modeling apparatus of claim 36, wherein at least two of said input section, recording section, identification number input section, identification number judging section, data outputting section, and modifying section are connected via a network.

39. A three-dimensional modeling apparatus of claim 36, wherein said data outputting section is a display device capable of three-dimensional display including stereo-scopic display.

40. A three-dimensional modeling apparatus of claim 36, wherein
said target is a person,
a voice of said target person is also input at said input section,
said voice is recorded at said recording section in addition to said three-dimensional shape data, and
said data outputting section is capable of outputting said three-dimensional shape data and/or said voice.

41. A three-dimensional modeling apparatus of claim 36, wherein
a plurality of facial expressions are input at said input section for one person,
said recording section records said plurality of facial expressions, and
said displaying section is capable of sequentially displaying said plurality of face expressions in response to directions by said customer.

42. A three-dimensional modeling apparatus for supplying a three-dimensional model of a target to a customer, comprising:
an input section for inputting three-dimensional shape data of said target;
a database section for storing the three-dimensional shape data input from said input section and related property information, wherein a number of accesses are also stored for and in addition to each of the three-dimensional shape data stored at said database section;
a charge computation device, wherein a charge process for charge targets stored in the database section is executed based on said number of accesses; and
a display section for displaying said stored three-dimensional shape data.

43. A three-dimensional modeling apparatus of claim 42, further comprising a modifying section for reading and modifying said stored three-dimensional shape data at said database section, and for re-storing the modified data to said database section.

44. A three-dimensional modeling apparatus of claim 43, wherein a thumbnail image of each of three-dimensional shape data is stored at said database section.

45. A three-dimensional modeling apparatus of claim 44, wherein said thumbnail image is produced by assigning a point of view for said three-dimensional shape data and obtaining a two-dimensional image seen from the assigned point of view.

46. A three-dimensional modeling apparatus of claim 44, wherein said thumbnail image is produced by assigning a plurality of points of view for said three-dimensional shape data and obtaining a series of two-dimensional images seen from these points of view.

47. A three-dimensional modeling apparatus of claim 44, wherein said thumbnail image is produced by selecting one of the two-dimensional images that were taken when inputting said three-dimensional shape data, and reducing the selected two-dimensional image.

48. A three-dimensional modeling apparatus of claim 44, wherein said thumbnail image is a reduced three-dimensional shape data obtained by reducing the data in said three-dimensional shape data.

49. A three-dimensional modeling apparatus of claim 42, further comprising a refund computation device, wherein a refund process for refund targets registered in the database section is executed based on said number of accesses.

50. A three-dimensional modeling apparatus of claim 42, wherein said data display section is a display device capable of three-dimensional display including stereo-scopic display.

* * * * *

UNITED STATES PATENT AND TRADEMARK OFFICE
CERTIFICATE OF CORRECTION

PATENT NO. : 7,006,952 B1
APPLICATION NO. : 09/913095
DATED : February 28, 2006
INVENTOR(S) : Matsumoto et al.

Page 1 of 1

It is certified that error appears in the above-identified patent and that said Letters Patent is hereby corrected as shown below:

Title Page 2, item 56, under the FOREIGN PATENT DOCUMENTS subsection of the "References Cited" section, "1004022" should read --10040422--

Title Page 2, item 56, under the "References Cited" section, --OTHER PUBLICATIONS "Nikkei PC Best MOOK" (in Japanese) Saishin CG Sofuto Kounyu Gaido, Edition '98-'99, (Japan) Nikkei BP Sha, (30.10.98), Page 117.-- should be added Signed and Sealed this Sixteenth Day of March, 2010

David J. Kappos
*Director of the United States Patent and Trademark Office*